(12) United States Patent
Suhama et al.

(10) Patent No.: US 8,502,493 B2
(45) Date of Patent: Aug. 6, 2013

(54) CONTROL DEVICE AND CONTROL METHOD FOR ALTERNATING-CURRENT MOTOR

(75) Inventors: Masayoshi Suhama, Toyota (JP); Shogo Tanaka, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 311 days.

(21) Appl. No.: 13/121,044

(22) PCT Filed: Oct. 6, 2009

(86) PCT No.: PCT/JP2009/067381
§ 371 (c)(1),
(2), (4) Date: Mar. 25, 2011

(87) PCT Pub. No.: WO2010/047221
PCT Pub. Date: Apr. 29, 2010

(65) Prior Publication Data
US 2011/0187308 A1 Aug. 4, 2011

(30) Foreign Application Priority Data
Oct. 23, 2008 (JP) ................. 2008-273371

(51) Int. Cl.
*H02P 23/00* (2006.01)
*H02P 27/06* (2006.01)
(52) U.S. Cl.
CPC ..................... *H02P 27/06* (2013.01)
USPC ........................ 318/798; 318/767; 318/727
(58) Field of Classification Search
CPC ....................................... H02P 27/06

USPC ........................................... 318/798, 767, 727
See application file for complete search history.

(56) References Cited

U.S. PATENT DOCUMENTS 6,324,085 B2 * 11/2001 Kimura et al. ................ 363/132
7,304,451 B2 * 12/2007 Morimoto et al. ............ 318/811

(Continued)

FOREIGN PATENT DOCUMENTS

DE 101 03 520 A1 8/2002
DE 10 2004 030 326 A1 2/2006

(Continued)

OTHER PUBLICATIONS

International Search Report for International Patent Application No. PCT/JP2009/067381, mailed on Jan. 12, 2010.

(Continued)

*Primary Examiner* — Eduardo Colon Santana
*Assistant Examiner* — David Luo
(74) *Attorney, Agent, or Firm* — Oliff & Berridge, PLC

(57) ABSTRACT

When instructed to switch control modes between overmodulation PWM control and sinusoidal wave PWM control, control device corrects the amplitude of a voltage command signal based on a state of power conversion operation performed by an inverter, so as to suppress a change in an influence of dead time over a voltage applied to an alternating-current motor upon switching the control modes. The state of the power conversion operation performed by the inverter includes at least one of a present value of a carrier frequency in a control mode currently employed, an estimated value of the carrier frequency to be obtained when switching the control modes, the length of the dead time, a power factor of alternating-current power exchanged between the inverter and the alternating-current motor, and a driving state of the alternating-current motor.

4 Claims, 15 Drawing Sheets

U.S. PATENT DOCUMENTS

| | | |
|---|---|---|
| 2002/0074969 A1 | 6/2002 | Edelson |
| 2004/0012203 A1 | 1/2004 | Schlangen |
| 2006/0049792 A1 | 3/2006 | Chen et al. |
| 2007/0262744 A1 | 11/2007 | Kahler et al. |
| 2010/0079104 A1 | 4/2010 | Becker et al. |

FOREIGN PATENT DOCUMENTS

| | | |
|---|---|---|
| DE | 10 2007 021 892 A1 | 12/2007 |
| DE | 10 2006 052 042 A1 | 5/2008 |
| JP | A-1-206878 | 8/1989 |
| JP | A-5-316735 | 11/1993 |
| JP | A-2005-124305 | 5/2005 |
| JP | A-2006-81287 | 3/2006 |
| JP | A-2006-136184 | 5/2006 |
| JP | A-2007-143235 | 6/2007 |
| JP | A-2007-143316 | 6/2007 |
| JP | A-2008-11682 | 1/2008 |
| WO | WO 2008/001524 A1 | 1/2008 |

OTHER PUBLICATIONS

Notice of Grounds of Rejection for corresponding Japanese Patent Application No. 2008-273371, mailed on Jan. 12, 2010 (w/ English translation).

Jul. 5, 2012 Office Action issued in German Patent Application No. 11 2009 002 569.2 (with translation).

\* cited by examiner

FIG.2

| CONTROL METHOD | SINUSOIDAL WAVE PWM | OVERMODULATION PWM | RECTANGULAR WAVE (ONE PULSE) |
|---|---|---|---|
| | PWM CONTROL MODE | | RECTANGULAR WAVE VOLTAGE CONTROL MODE |
| WAVEFORM OF OUTPUT VOLTAGE OF INVERTER | FUNDAMENTAL WAVE COMPONENT | FUNDAMENTAL WAVE COMPONENT | FUNDAMENTAL WAVE COMPONENT |
| MODULATION FACTOR | 0~APPROXIMATELY 0.61 | MAXIMAL VALUE IN SINUSOIDAL WAVE PWM TO 0.78 | 0.78 |
| CHARACTERISTIC | SMALL TORQUE FLUCTUATION | IMPROVED OUTPUT IN MIDDLE SPEED REGION | IMPROVED OUTPUT IN HIGH SPEED REGION |

FIG.3

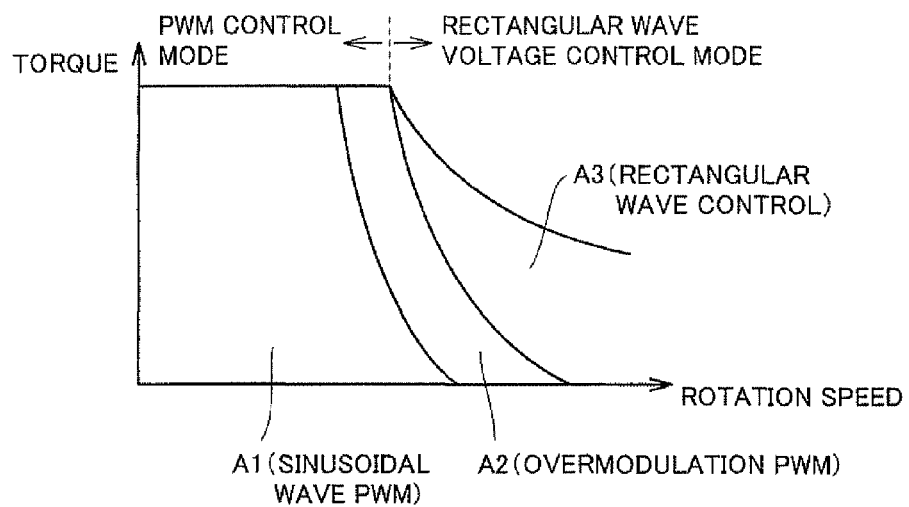

FIG.9
(a) DURING POWER RUNNING
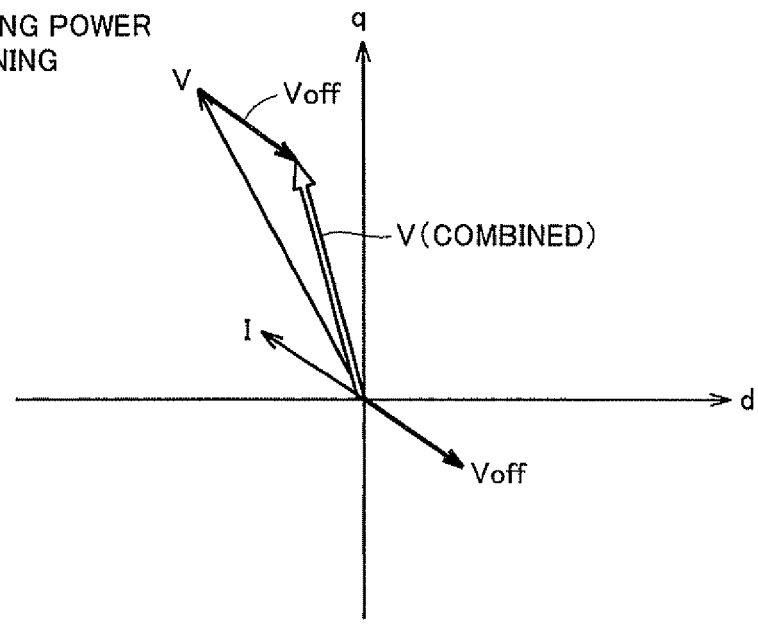
(b) DURING REGENERATION
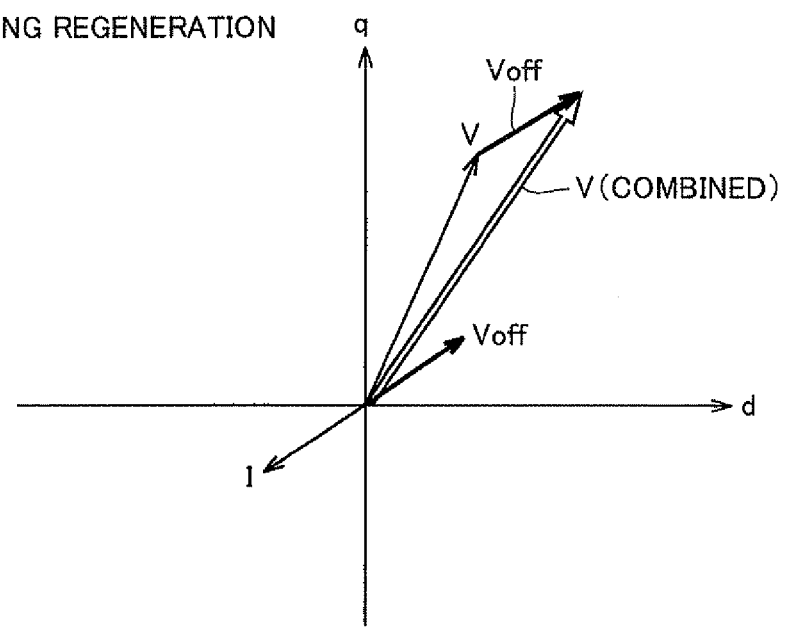

| CARRIER FREQUENCY | | MODULATION FACTOR UPON SWITCHING | |
|---|---|---|---|
| SINUSOIDAL WAVE PWM → | OVERMODULATION PWM | DURING POWER RUNNING | DURING REGENERATION |
| fc1 | fo1 | 0.61−ΔF1 | 0.61+ΔF1 |
| fc2 | fo2 | 0.61−ΔF2 | 0.61+ΔF2 |
| fc3 | fo3 | 0.61−ΔF3 | 0.61+ΔF3 |
| fc4 | fo4 | 0.61−ΔF4 | 0.61+ΔF4 |
| ⋮ | ⋮ | ⋮ | ⋮ |

FIG.17

| SINUSOIDAL WAVE PWM | OVERMODULATION PWM | DURING POWER RUNNING | | DURING REGENERATION | |
|---|---|---|---|---|---|
| | | UPON SLIP | UPON GRIP | UPON SLIP | UPON GRIP |
| fc1 | fo1 | $0.61 - \Delta F1$ | | $0.61 + \Delta F1$ | |
| | | $0.61 - \Delta F1s$ | $0.61 - \Delta F1g$ | $0.61 + \Delta F1s$ | $0.61 + \Delta F1g$ |
| fc2 | fo2 | $0.61 - \Delta F2$ | | $0.61 + \Delta F2$ | |
| | | $0.61 - \Delta F2s$ | $0.61 - \Delta F2g$ | $0.61 + \Delta F2s$ | $0.61 + \Delta F2g$ |
| ⋮ | ⋮ | ⋮ | | ⋮ | |

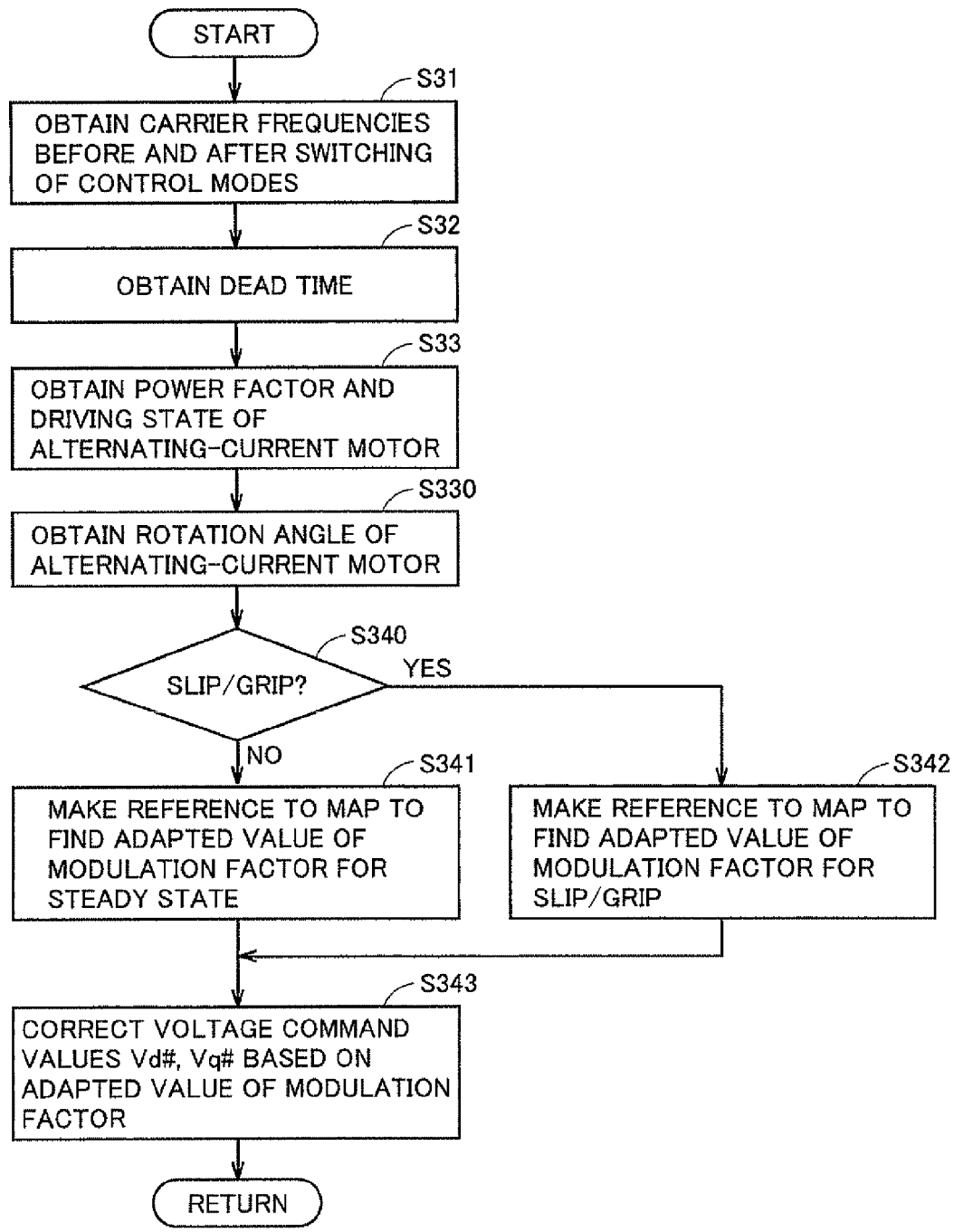

CONTROL DEVICE AND CONTROL METHOD FOR ALTERNATING-CURRENT MOTOR

TECHNICAL FIELD

The present invention relates to a control device and a control method for an alternating-current motor, more particularly, to control for the alternating-current motor, in which pulse width modulation (PWM) control having a sinusoidal wave modulation mode and an overmodulation mode is applied.

BACKGROUND ART

A driving method using an inverter has been employed to control an alternating-current motor using a direct-current power source. The inverter is controlled for switching by an inverter driving circuit. For example, the alternating-current motor is fed with a voltage switched in accordance with PWM control.

Further, Japanese Patent Laying-Open No. 2008-11682 (Patent Document 1) discloses a PWM control configuration for control of driving of such an alternating-current motor. In current feedback control for compensating a deviation of a d deviation axis current and a deviation of a q axis current, the PWM control configuration selectively applies sinusoidal wave PWM control (FIG. 2 of Patent Document 1) and overmodulation PWM control (FIG. 3 of Patent Document 1). In the sinusoidal wave PWM control, the amplitude of a voltage command is not more than the amplitude of a reference triangular wave, whereas in the overmodulation PWM control, the amplitude of the voltage command exceeds the peak value of the reference triangular wave.

In particular, in Patent Document 1, for the control for the alternating-current motor, rectangular wave control is further applied. In the rectangular wave control, the alternating-current motor is fed with a rectangular wave voltage having a voltage phase controlled in accordance with a torque deviation. Also described therein is an art for stabilizing the switching of control modes between the rectangular wave control and the overmodulation PWM control.

PRIOR ART DOCUMENTS

Patent Documents

Patent Document 1: Japanese Patent Laying-Open No. 2008-11682
Patent Document 2: Japanese Patent Laying-Open No. 2006-136184

SUMMARY OF THE INVENTION

Problems to be Solved by the Invention

In the PWM control of Patent Document 1, the switching between the sinusoidal wave PWM control and the overmodulation PWM control is determined based on a comparison between the amplitude of a voltage required by the alternating-current motor and a threshold voltage. Patent Document 1 describes that this threshold representatively corresponds to the absolute value of a peak value of a reference triangular wave voltage, and it is appreciated that the threshold is a fixed value.

However, as understood from FIG. 3 of Patent Document 1, in the overmodulation PWM control, the switching rate in the inverter is reduced to increase a fundamental wave component in a voltage applied to the alternating-current motor. Further, the normal sinusoidal wave PWM control is performed in a manner of so-called "asynchronous PWM", in which a carrier frequency is fixed to a high frequency. On the other hand, in the overmodulation PWM control, so-called "synchronous PWM" may be applied to prevent the positive value and the negative value of the voltage applied to the alternating-current motor from differing in absolute value in response to the reduced switching rate, thereby variably controlling the carrier frequency in accordance with the rotation speed of the alternating-current motor.

Further, in the control for switching in the inverter, in order to prevent a short-circuit current between upper/lower arm elements of the same phase, a dead time, in which both the upper/lower arms of the phase are turned off, has to be provided for practical reasons when switching the switching elements to be on/off. If this dead time causes a great change in the switching rate in the inverter when switching the control modes, an influence of the dead time over the output voltage of the inverter, i.e., over the voltage applied to the alternating-current motor may be greatly changed.

When such a phenomenon takes place, the switching of the control modes triggers a great change in voltage applied to the alternating-current motor, even if the voltage command is the same. Hence, just after the switching of the control modes, a motor current fluctuates depending on an amount of change in the applied voltage. Accordingly, an excessive motor current may flow in the alternating-current motor. This may cause torque fluctuation in the alternating-current motor during a period of time from the switching of the control modes until the fluctuation of the motor current is converged as a result of current feedback control.

In view of this, the present invention is made to solve such a problem, and has its object to achieve stabilized control by preventing occurrence of toque fluctuation upon switching between control modes in PWM control for an alternating-current motor, in which overmodulation PWM control (overmodulation mode) and sinusoidal wave PWM control (sinusoidal wave modulation mode) are selectively applied.

Means for Solving the Problems

According to an aspect of the present invention, a control device for an alternating-current motor is a control device for an alternating-current motor to which a voltage controlled by an inverter is applied. The control device includes: a pulse width modulation control unit for generating a control command for the inverter by means of pulse width modulation control performed based on a comparison between a voltage command signal of a sinusoidal wave and a carrier signal, the voltage command signal being for operating the alternating-current motor in accordance with an operating command; and a mode-switching determining unit for instructing which control mode of an overmodulation mode and a sinusoidal wave modulation mode is to be employed for the pulse width modulation control performed by the pulse width modulation control unit, in the overmodulation mode, the voltage command signal having an amplitude larger than that of the carrier signal, in the sinusoidal wave modulation mode, the voltage command signal having an amplitude equal to or smaller than that of the carrier signal. The inverter includes a power semiconductor switching element to be turned on/off in accordance with the control command from the pulse width modulation control unit. When the mode-switching determining unit instructs to switch the control modes between the overmodulation mode and the sinusoidal wave modulation mode, the pulse width modulation control unit corrects the amplitude of the voltage command signal based on a state of a power conversion operation performed by the inverter, so as to suppress a change in an influence of dead time over the voltage applied to the alternating-current motor upon switching the control modes.

Preferably, the pulse width modulation control unit includes: a frequency control unit for controlling, in the overmodulation mode, a frequency of the carrier signal to be an integral multiple of a rotational frequency of the alternating-current motor, in accordance with a rotational speed of the alternating-current motor, and controlling, in the sinusoidal wave modulation mode, the frequency of the carrier signal in accordance with operation states of the inverter and the alternating-current motor irrespective of the rotational speed of the alternating-current motor; a voltage change amount estimating unit for estimating an amount of change, to be caused upon switching the control modes, in the voltage applied to the alternating-current motor, based on at least one of a present value of the frequency of the carrier signal in a control mode currently employed, an estimated value of the frequency of the carrier signal to be obtained when switching the control modes, a length of the dead time, a power factor of alternating-current power exchanged between the inverter and the alternating-current motor, and a driving state of the alternating-current motor; and a voltage command correcting unit for correcting the amplitude of the voltage command signal so as to compensate the amount of change in the voltage applied to the alternating-current motor, the amount of change having been estimated by the voltage change amount estimating unit.

According to another aspect of the present invention, a control method for an alternating-current motor to which a voltage controlled by an inverter is applied includes the steps of: generating a control command for the inverter by means of pulse width modulation control performed based on a comparison between a voltage command signal of a sinusoidal wave and a carrier signal, the voltage command signal being for operating the alternating-current motor in accordance with an operating command; and instructing which control mode of an overmodulation mode and a sinusoidal wave modulation mode is to be employed for the pulse width modulation control, in the overmodulation mode, the voltage command signal having an amplitude larger than that of the carrier signal, in the sinusoidal wave modulation mode, the voltage command signal having an amplitude equal to or smaller than that of the carrier signal. The inverter includes a power semiconductor switching element to be turned on/off in accordance with the control command. When instructed to switch the control modes between the overmodulation mode and the sinusoidal wave modulation mode, the step of generating the control command for the inverter corrects the amplitude of the voltage command signal based on a state of a power conversion operation performed by the inverter, so as to suppress a change in an influence of dead time over the voltage applied to the alternating-current motor upon switching the control modes.

Preferably, the step of generating the control command for the inverter including the steps of: controlling, in the overmodulation mode, a frequency of the carrier signal to be an integral multiple of a rotational frequency of the alternating-current motor, in accordance with a rotational speed of the alternating-current motor, and controlling, in the sinusoidal wave modulation mode, the frequency of the carrier signal in accordance with operation states of the inverter and the alternating-current motor irrespective of the rotational speed of the alternating-current motor; estimating an amount of change, to be caused upon switching the control modes, in the voltage applied to the alternating-current motor, based on at least one of a present value of the frequency of the carrier signal in a control mode currently employed, an estimated value of the frequency of the carrier signal to be obtained when switching the control modes, a length of the dead time, a power factor of alternating-current power exchanged between the inverter and the alternating-current motor, and a driving state of the alternating-current motor; and correcting the amplitude of the voltage command signal so as to compensate the estimated amount of change in the voltage applied to the alternating-current motor.

Effects of the Invention

According to the present invention, in PWM control for an alternating-current motor in which an overmodulation mode and a sinusoidal wave modulation mode are selectively applied, occurrence of torque serge can be prevented upon switching the control modes, thereby achieving stable control.

BRIEF DESCRIPTION OF THE DRAWINGS

FIG. 2 schematically illustrates control modes for the alternating-current motor in the motor driving system in the embodiment of the present invention.

FIG. 3 illustrates a corresponding relation between an operation state of the alternating-current motor and each of the control modes shown in FIG. 2.

FIG. 9 is a schematic view showing typical voltage and current vectors upon power running and regeneration of the alternating-current motor.

FIG. 17 shows one exemplary map of modulation factors used upon the control mode switching in a variation of the embodiment of the present invention.

FIG. 18 is a flowchart illustrating a correcting process for each voltage command value in the variation of the embodiment of the present invention.

MODES FOR CARRYING OUT THE INVENTION

Figure 1:
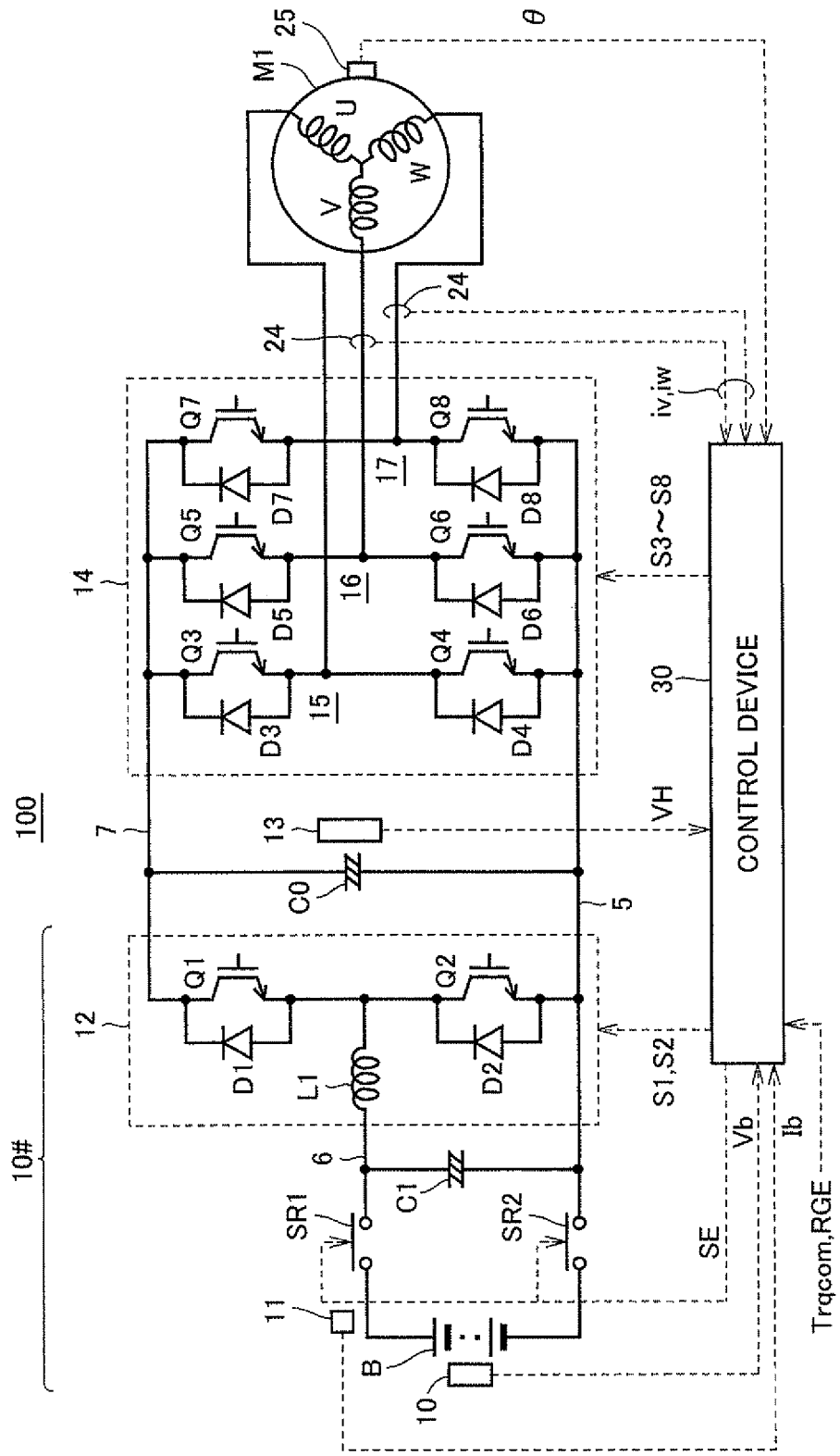
FIG. 1 shows an entire configuration of a motor driving control system to which a control device and a control method for an alternating-current motor in an embodiment of the present invention is applied.

The following describes an embodiment of the present invention with reference to figures. It should be noted that the same reference character in the figures indicate the same or corresponding portions.

(Entire System Configuration)

FIG. 1 shows an entire configuration of a motor driving control system to which a control device and a control method for an alternating-current motor in accordance with an embodiment of the present invention are applied.

Referring to FIG. 1, motor driving control system 100 includes a direct-current voltage generating unit 10#, a smoothing capacitor C0, an inverter 14, an alternating-current motor M1, and a control device 30.

Alternating-current motor M1 is, for example, a driving motor for generating a torque to drive driving wheels of an electrically powered vehicle. (The electrically powered vehicle herein refers to a vehicle which generates vehicle driving power by means of electrical energy, such as a hybrid vehicle, an electric vehicle, or a fuel cell vehicle.) Alternatively, alternating-current motor M1 may be configured to have a function of a power generator driven by an engine, and may be configured to have functions of both a motor and a power generator. Further, alternating-current motor M1 may operate as a motor for the engine and may be incorporated in a hybrid vehicle as a component capable of starting the engine, for example. In other words, the alternating-current motor in the present embodiment includes an alternating-current driven motor, a power generator, and a motor generator.

Direct-current voltage generating unit 10# includes a direct-current power source 13, system relays SR1, SR2, a smoothing capacitor C1, and a step-up/step-down converter 12.

Direct-current power source B is constituted by a nickel hydrogen or lithium ion secondary battery, or a power storage device such as an electric double layer capacitor, representatively. Direct-current power source B outputs a direct-current voltage Vb and receives and sends a direct-current Ib, which are detected by a voltage sensor 10 and a current sensor 11 respectively.

System relay SR1 is connected between the positive electrode terminal of direct-current power source B and a power line 6, whereas system relay SR2 is connected between the negative electrode terminal of direct-current power source B and an earth line 5. Each of system relays SR1, SR2 is turned on/off in response to a signal SE from control device 30.

Step-up/step-down converter 12 includes a reactor L1, power semiconductor switching elements Q1, Q2, and diodes D1, D2. Power semiconductor switching elements Q1 and Q2 are connected between a power line 7 and earth line 5 in series. Turning on/off power semiconductor switching elements Q1 and Q2 is controlled by means of switching control signals S1 and S2 supplied from control device 30.

In the embodiment of the present invention, an IGBT (Insulated Gate Bipolar Transistor), a power MOS (Metal Oxide Semiconductor) transistor, a power bipolar transistor, or the like can be used as each of the power semiconductor switching elements (hereinafter, each simply referred to as "switching element"). Anti-parallel diodes D1, D2 are provided for switching elements Q1, Q2 respectively. Reactor L1 is connected between a connection node of switching elements Q1, Q2 and power line 6. Further, smoothing capacitor C0 is connected between power line 7 and earth line 5.

Inverter 14 includes U-phase upper/lower arms 15, V-phase upper/lower arms 16, and W-phase upper/lower arms 17, which are provided in parallel between power line 7 and earth line 5. Each of the upper/lower phase arms includes switching elements connected between power line 7 and earth line 5 in series. For example, U-phase upper/lower arms 15 include switching elements Q3, Q4 respectively. V-phase upper/lower arms 16 include switching elements Q5, Q6 respectively. W-phase upper/lower arms 17 include switching elements Q7, Q8 respectively. Further, anti-parallel diodes D3-D8 are connected to switching elements Q3-Q8 respectively. Turning on/off switching elements Q3-Q8 is controlled by means of switching control signals S3-S8 supplied from control device 30.

Typically, alternating-current motor M1 is a three-phase permanent magnet synchronous motor, and is configured to have three coils of the U, V, W phases, each having one end connected to a neutral point commonly. Each of the phase coils has the other end connected to the intermediate point of the switching elements of each of upper/lower phase arms 15-17.

In a step-up operation, step-up/step-down converter 12 steps up a direct-current voltage Vb supplied from direct-current power source B to obtain a direct-current voltage VH, which corresponds to a voltage input to inverter 14 and is hereinafter also referred to as "system voltage", and supplies it to inverter 14. More specifically, in response to switching control signals S1, S2 from control device 30, a period during which switching element Q1 is on and a period during which switching element Q2 is on (or a period during which both switching elements Q1, Q2 are off) are provided to come alternately. A step-up ratio is in accordance with the ratio of these on periods. Alternatively, with switching elements Q1 and Q2 being fixed to on and off respectively, VH=Vb (step-up ratio=1.0) may be attained.

On the other hand, in a step-down operation, step-up/step-down converter 12 steps down direct-current voltage VH (system voltage) supplied from inverter 14 via smoothing capacitor C0 to charge direct-current power source B. More specifically, in response to switching control signals S1, S2 from control device 30, a period during which only switching element Q1 is on, and a period during which both switching elements Q1, Q2 are off (or on period of switching element Q2) are provided to come alternately. A step-down ratio is in accordance with the duty ratio of the foregoing on period.

Smoothing capacitor C0 smoothes the direct-current voltage supplied from step-up/step-down converter 12, and supplies the smoothed direct-current voltage to inverter 14. A voltage sensor 13 detects the voltage across smoothing capacitor C0, i.e., system voltage VH, and sends the detected value thereof to control device 30.

When the torque command value of alternating-current motor M1 is positive (Trqcom>0) and a direct-current voltage is supplied from smoothing capacitor C0, inverter 14 converts the direct-current voltage into an alternating-current voltage by means of switching operations of switching elements Q3-Q8 responding to switching control signals S3-S8 from control device 30, so as to drive alternating-current motor M1 to output a positive torque. Meanwhile, when the torque command value for alternating-current motor M1 has a value of 0 (Trqcom=0), inverter 14 converts the direct-current voltage into an alternating-current voltage by means of switching operations responding to switching control signals S3-S8 and drives alternating-current motor M1 to obtain a torque of 0. By controlling in this way, alternating-current motor M1 is driven to generate a torque of 0 or of a positive value as designated by torque command value Trqcom.

Furthermore, upon regenerative braking of an electrically powered vehicle having motor driving control system 100 mounted thereon, torque command value Trqcom of alternating-current motor M1 is set to a negative value (Trqcom<0). In this case, by means of switching operations responding to switching signals S3-S8, inverter 14 converts an alternating-current voltage generated by alternating-current motor M1 into a direct-current voltage, and supplies the converted direct-current voltage (system voltage) to step-up/step-down converter 12 via smoothing capacitor C0. It should be noted that the term "regenerative braking" as described herein includes: braking involving regenerative power generation resulting from manipulation of the foot brake pedal by a driver who drives the electrically powered vehicle; and vehicular speed reduction (or stop of acceleration) involving regenerative power generation achieved by easing off the accelerator pedal during traveling without manipulating the foot brake pedal.

Current sensors 24 detect a motor current flowing in alternating-current motor M1, and notify control device 30 of the detected motor currents. The sum of the instantaneous values of three phase currents iu, iv, iw is zero. Hence, it is sufficient to dispose current sensors 24 to detect motor currents for two phases (for example, V-phase current iv and W-phase current iw) as shown in FIG. 1.

A rotational angle sensor (resolver) 25 detects a rotor rotational angle θ of alternating-current motor M1, and notifies control device 30 of rotational angle θ thus detected. Control device 30 can calculate the rotation rate (rotation speed) and angular velocity ω (rad/s) of alternating-current motor M1 based on rotational angle θ. It should be noted that rotational angle sensor 25 may not be provided when control device 30 directly finds rotational angle θ from the motor voltage and current.

Control device 30 is constituted by an electronic control unit (ECU), and controls operations of motor driving control system 100 by means of software processing implemented by a CPU not shown in the figures executing a program stored in advance and/or hardware processing implemented by a dedicated electronic circuit.

As a representative function, control device 30 controls operations of step-up/step-down converter 12 and, inverter 14 using a below-described control method based on input torque command value Trqcom, direct-current voltage Vb detected by voltage sensor 10, direct-current Ib detected by current sensor 11, system voltage VH detected by voltage sensor 13, motor currents iv, iw detected by current sensors 24, rotational angle θ detected by rotational angle sensor 25, and the like, so as to allow alternating-current motor M1 to output a torque according to torque command value Trqcom. In other words, control device 30 generates switching control signals S1-S8 for controlling step-up/step-down converter 12 and inverter 14 in the manner described above, and sends them to step-up/step-down converter 12 and inverter 14.

In the step-up operation of step-up/step-down converter 12, control device 30 controls system voltage VH through feedback to generate switching control signals S1, S2 so that system voltage VH has a value equal to the voltage command value.

Further, when control device 30 receives from the external ECU a signal RGE indicating that the electrically powered vehicle has entered the regenerative braking mode, control device 30 generates switching control signals S3-S8 to convert the alternating-current voltage generated by alternating-current motor M1 into a direct-current voltage, and outputs them to inverter 14. Accordingly, inverter 14 converts the alternating-current voltage generated by alternating-current motor M1 into the direct-current voltage and supplies it to step-up/step-down converter 12.

Furthermore, when control device 30 receives from the external ECU signal RGE indicating that the electrically powered vehicle has entered the regenerative braking mode, control device 30 generates switching control signals S1, S2 to step down the direct-current voltage supplied from inverter 14, and outputs them to step-up/step-down converter 12. Accordingly, the alternating-current voltage generated by alternating-current motor M1 is converted into a direct-current voltage, which is then stepped down and is supplied to direct-current power source B.

(Explanation for Control Modes)

The following describes how control device 30 controls alternating-current motor M1, more in detail.

FIG. 2 schematically illustrates control modes for alternating-current motor M1 in the motor driving system in the embodiment of the present invention.

As shown in FIG. 2, in motor driving control system 100 according to the embodiment of the present invention, three control modes are utilized and are switched thereamong for control for alternating-current motor M1, i.e., power conversion in inverter 14.

Sinusoidal wave PWM control is utilized as general PWM control, and is to control the upper/lower arm elements of each phase to turn on/off, in accordance with a comparison of voltage between a voltage command of a sinusoidal wave and a carrier (of a triangular wave, representatively). As a result, a duty is controlled so that the fundamental wave component is a sinusoidal wave during a certain period in a set of a high level period and a low level period. The high level period corresponds to an on period of the upper arm element whereas the low level period corresponds to an on period of the lower arm element. As known well, in the sinusoidal wave PWM control, the amplitude of a voltage command indicating a sinusoidal wave is limited to a range not more than the amplitude of the carrier, and therefore the fundamental wave component of the voltage applied to alternating-current motor M1 (hereinafter, simply referred to as "motor applied voltage") can be increased greater only by approximately 0.61 times than the direct-current link voltage of the inverter. Hereinafter, in the present specification, a ratio of the fundamental wave component (actual value) of the voltage (line voltage) applied to alternating-current motor M1 to the direct-current link voltage of inverter 14 (i.e., system voltage VH) is referred to as "modulation factor".

In the sinusoidal wave PWM control, the amplitude of the voltage command indicating a sinusoidal wave falls within a range not more than the amplitude of the carrier. Hence, line voltage applied to alternating-current motor M1 represents a sinusoidal wave. Meanwhile, there has also been proposed a control method of generating a voltage command by superimposing a 3n-th order harmonic component (n: natural number, representatively a third order harmonic with n=1) on a sinusoidal wave component falling within the range not more than the amplitude of the carrier. In this control method, there occurs a period in which the voltage command is increased in amplitude higher than the amplitude of the carrier by the harmonic component. However, the 3n-th order harmonic component superimposed on each phase is canceled between the lines. Hence, the line voltage is maintained to represent the sinusoidal wave. In the present embodiment, it is assumed that this control method is also included in the sinusoidal wave PWM control.

On the other hand, in the rectangular wave voltage control, during the certain period of time, alternating-current motor M1 is fed with one pulse of a rectangular wave in which a ratio of the high level period and the low level period is 1:1. This increases the modulation factor up to 0.78.

Overmodulation PWM control is to perform PWM control similar to that in the sinusoidal wave PWM control, in a range in which the amplitude of the voltage command (sinusoidal wave component) is larger than the amplitude of the carrier. In particular, the voltage command, which originally represents a sinusoidal wave, is distorted (amplitude correction) to increase the fundamental wave component. In this way, the modulation factor can be increased up to a range from the maximal modulation factor in the sinusoidal wave PWM control mode to 0.78. In the overmodulation PWM control, the amplitude of the voltage command (sinusoidal wave component) is larger than that of the carrier, so the line voltage applied to alternating-current motor M1 is not a voltage representing a sinusoidal wave but a distorted voltage.

In alternating-current motor M1, increase in the rotation speed or the output torque causes increased induced voltage. Accordingly, required driving voltage (motor required voltage) is high. The step-up voltage provided by converter 12, i.e., system voltage VH needs to be set higher than this motor required voltage. On the other hand, the step-up voltage provided by step-up/step-down converter 12, i.e., system voltage VH has a limit value (VH maximal voltage).

Thus, in accordance with an operation state of alternating-current motor M1, one of the PWM control mode and the rectangular wave voltage control mode is selectively applied. The PWM control mode employs the sinusoidal wave PWM control or the overmodulation PWM control to control the amplitude and phase of the motor applied voltage (alternating current) through feedback of the motor current. In the rectangular wave voltage control, the amplitude of the motor applied voltage is fixed. Hence, the torque is controlled through phase control for the pulse of the rectangular wave voltage, based on a deviation between the torque actual value and the torque command value.

FIG. 3 shows a correspondence relation between each of operation states of alternating-current motor M1 and the above-described control modes.

Referring to FIG. 3, schematically, the sinusoidal wave PWM control is used in a low rotation speed region A1 to reduce fluctuation of torque, the overmodulation PWM control is applied in a middle rotation speed region A2, and the rectangular wave voltage control is applied in a high rotation speed region A3. In particular, the overmodulation PWM control and the rectangular wave voltage control thus applied allow for improved output of alternating-current motor M1. As such, which one of the control modes shown in FIG. 2 is used is determined within a range of an implementable modulation factor, basically.

(Explanation for Control Configuration in Each Control Mode)

Figure 4:
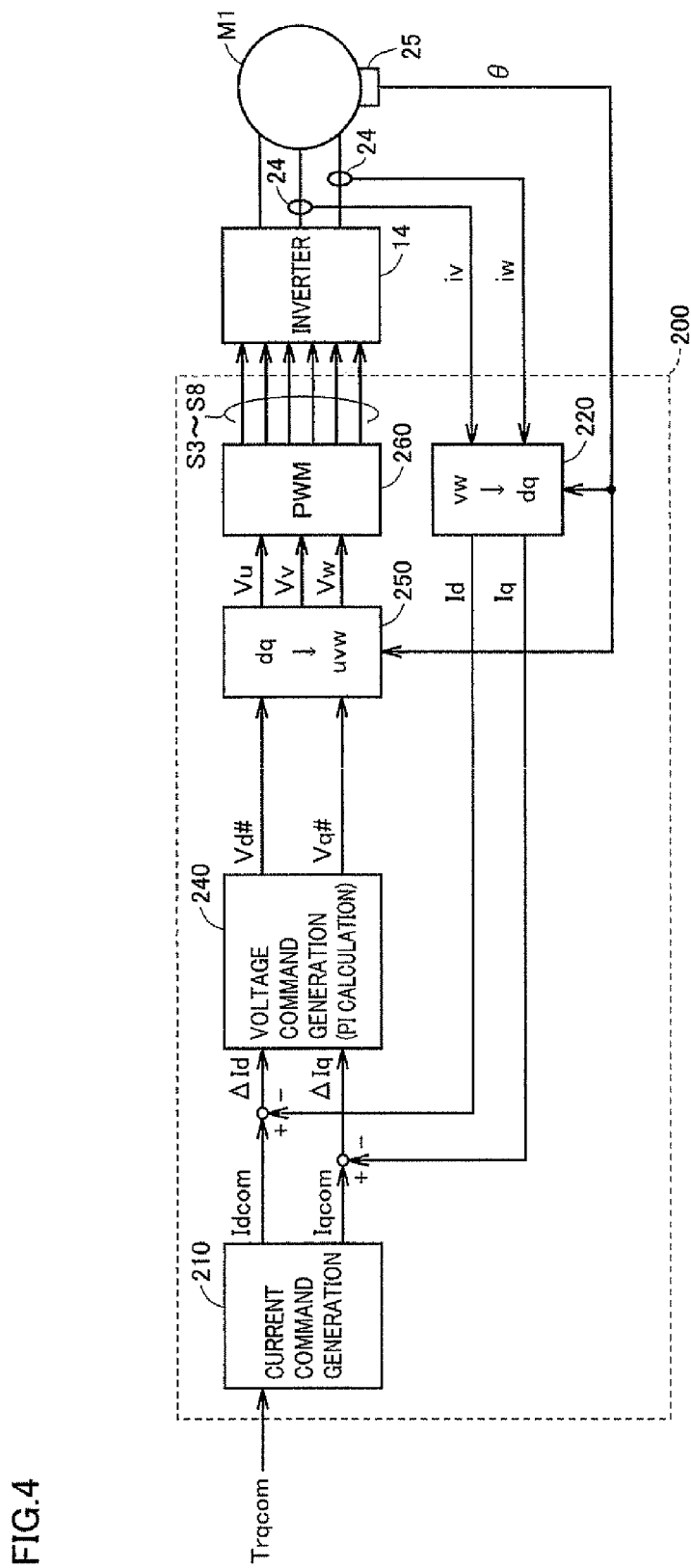
FIG. 4 is a block diagram illustrating a general example of a motor control configuration for sinusoidal wave PWM control.

FIG. 4 is a block diagram illustrating a general example of a motor control configuration employing the sinusoidal wave PWM control, the motor control configuration being a basic control configuration achieved by the control device for the alternating-current motor according to the embodiment of the present invention. Each functional block shown in FIG. 4 and below-described block diagrams for the motor control is implemented by a hardware or software process performed by control device 30.

Referring to FIG. 4, when the sinusoidal PWM control mode is selected, a sinusoidal PWM control unit 200 generates switching control signals S3-S8 for inverter 14 so as to allow alternating-current motor M1 to output a torque according to torque command value Trqcom.

Sinusoidal wave PWM control unit 200 includes a current command generating unit 210, coordinate conversion units 220, 250, a voltage command generating unit 240, and a PWM modulation unit 260.

Current command generating unit 210 generates a d-axis current command value Idcom and a q axis current command value Iqcom each corresponding to torque command value Trqcom of alternating-current motor M1, in accordance with a table or the like prepared in advance.

Coordinate conversion unit 220 performs coordinate conversion (from three phases to two phases) using rotation angle $\theta$ of alternating-current motor M1 detected by rotational angle sensor 25 so as to calculate a d-axis current Id and a q-axis current Iq based on V-phase current iv and W-phase current iw detected by current sensors 24.

Current command generating unit 240 receives a deviation $\Delta Id$ ($\Delta Id = Idcom - Id$) of the d-axis current from the command value and a deviation $\Delta Iq$ ($\Delta Iq = Iqcom - Iq$) of the q-axis current from the command value. Current command generating unit 240 performs PI (proportional integral) calculation of each of d-axis current deviation $\Delta Id$ and q-axis current deviation $\Delta Iq$ with a predetermined gain so as to determine a control deviation, and generates a d-axis voltage command value Vd# and a q-axis voltage command value Vq# based on this control deviation.

Coordinate conversion unit 250 performs coordinate conversion (two phases to three phases) using rotation angle $\theta$ of alternating-current motor M1, so as to convert d-axis voltage command value Vd# and q-axis voltage command value Vq# into U-phase, V-phase, W-phase voltage commands Vu, Vv, Vw.

Figure 5:
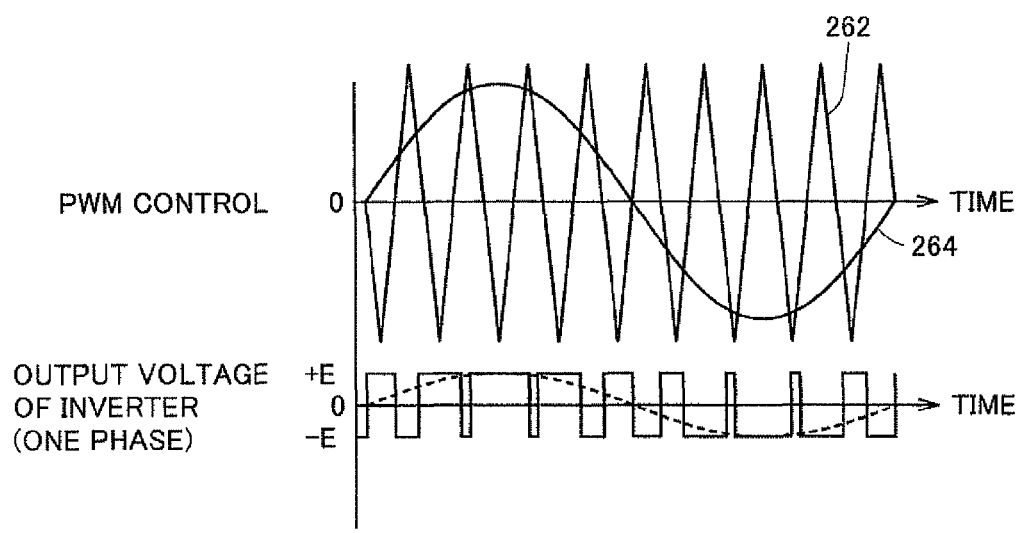
FIG. 5 is a waveform diagram illustrating an operation of a PWM modulation unit shown in FIG. 4.

As shown in FIG. 5, PWM modulation unit 260 controls the upper/lower arm elements of the respective phases in inverter 14 to turn on/off, based on a comparison between carrier 262 and alternating-current voltage command 264 (which represents Vu, Vv, Vw collectively), thereby generating pseudo sinusoidal wave voltages of the phases in alternating-current motor M1. Carrier 262 is constituted by a triangular wave or saw-tooth-wave having a predetermined frequency. As described above, on the alternating-current voltage command indicating the sinusoidal wave, the 3n-th order harmonic can be superimposed.

It should be noted that in the PWM modulation for inverter control, the amplitude of carrier 262 corresponds to the input direct-current voltage (system voltage VH) of inverter 14. However, the amplitude of carrier 262 to be employed by PWM modulation unit 260 can be fixed by converting the amplitude of alternating-current voltage command 264 to be subjected to the PWM modulation, into an amplitude obtained by dividing the original amplitude of each phase voltage command Vu, Vv, Vw by system voltage VH.

Referring to FIG. 4 again, when inverter 14 is controlled to switch in accordance with switching control signals S3-S8 generated by sinusoidal wave PWM control unit 200, an alternating voltage is applied to alternating-current motor M1 so as to output a torque in accordance with torque command value Trqcom.

Figure 6:
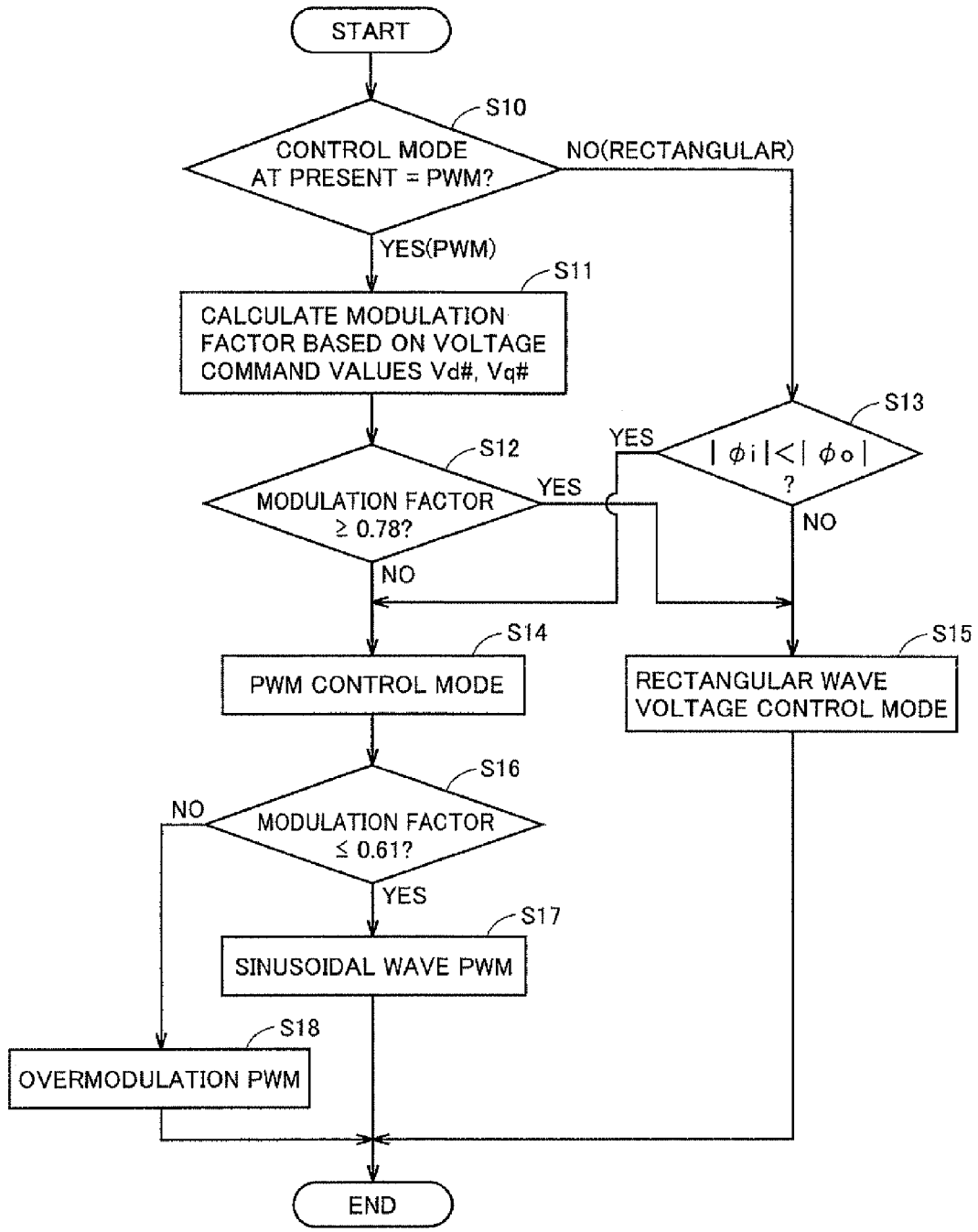
FIG. 6 is a flowchart illustrating a determination process for switching the control modes between the sinusoidal wave PWM control and the other control method in the control device for the alternating-current motor in the embodiment of the present invention.

The following describes determination of switching of the control modes between the sinusoidal wave PWM control and the other control method, with reference to FIG. 6.

Referring to FIG. 6, in step S10, control device 30 determines whether or not the control mode at present is the PWM control mode. When the control mode at present is the PWM control mode (when it is determined YES in S10), in step S11, control device 30 calculates a modulation factor for converting input voltage VH of inverter 14 into a motor applied voltage to be applied to alternating-current motor M1, based on voltage command values Vd#, Vq#, which follow the PWM control mode, and system voltage VH.

For example, modulation factor FM is calculated by means of the following formula (1):

$$FM=(Vd\#^2+Vq\#^2)^{1/2}/VH \qquad (1)$$

In step S12, control device 30 determines whether or not the modulation factor calculated in step S11 is equal to or greater than 0.78. When modulation factor≧0.78 (when it is determined YES in S12), an appropriate alternating-current voltage cannot be generated with the PWM control mode, so control device 30 proceeds with the process to step S15 so as to switch the control modes to the rectangular wave voltage control mode.

On the other hand, when it is determined NO in step S12, i.e., when the modulation factor calculated in step S11 is smaller than 0.78, control device 30 maintains the PWM control mode in step S14, continuously.

Meanwhile, when the control mode at present is the rectangular wave voltage control mode (when it is determined NO in S10), in step S13, control device 30 monitors whether or not the absolute value of alternating-current phase (actual current phase) ϕi supplied from inverter 14 to alternating-current motor M1 is smaller than the absolute value of a predetermined switching current phase ϕ0. It should be noted that switching current phase ϕ0 may be set at different values when alternating-current motor M1 performs power running and when alternating-current motor M1 performs regeneration.

When the absolute value of actual current phase ϕi is smaller than the absolute value of switching current phase ϕ0 (when it is determined YES in S13), control device 30 determines to switch the control modes from the rectangular wave voltage control mode to the PWM control. In this case, in step S14, control device 30 selects the PWM control mode.

On the other hand, when it is determined NO in step S13, i.e., when the absolute value of actual current phase ϕi is equal to or greater than the absolute value of switching current phase ϕ0, in step S15, control device 30 maintains the control mode to be the rectangular wave voltage control mode.

When the PWM control mode has been selected (S14), in step S16, control device 30 determines which one of the sinusoidal wave PWM control and the overmodulation PWM control is applied. This determination can be performed by comparing modulation factor FM with a predetermined threshold value (for example, 0.61, which is a theoretical maximal value of the modulation factor when the sinusoidal wave PWM control is applied).

When the modulation factor is equal to or smaller than the threshold value (it is determined YES in S16), i.e., when the PWM control can be performed to achieve the amplitude of alternating-current voltage command 264 (sinusoidal wave component) equal to or smaller than the amplitude of carrier 262, the sinusoidal wave PWM control is applied in step S17.

On the other hand, when the modulation factor is greater than the threshold value (it is determined NO in S16), i.e., when the amplitude of alternating-current voltage command 264 (sinusoidal wave component) is greater than the amplitude of carrier 262, the overmodulation PWM control is applied in step S18.

In this way, the determination of switching between the control modes can be done based on motor current MCRT (iv, iw) detected by current sensors 24, input voltage (system voltage) VH of inverter 14 detected by voltage sensor 13, and voltage command values Vd#, Vq# generated by voltage command generating unit 240.

Figure 7:
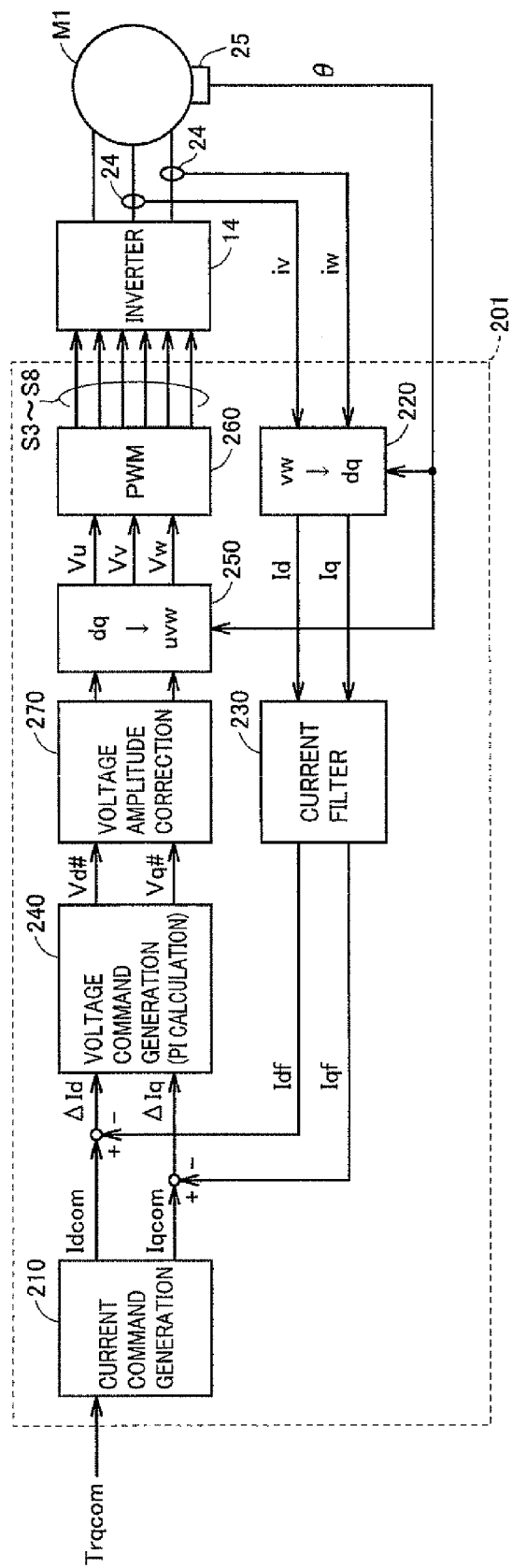
FIG. 7 is a block diagram illustrating a general example of a motor control configuration in the overmodulation PWM control.

FIG. 7 is a block diagram illustrating a general exemplary motor control configuration employed in the overmodulation PWM control, which is implemented when the overmodulation PWM control is applied in the control mode switching determination process shown in FIG. 6.

Referring to FIG. 7, an overmodulation PWM control unit 201 includes a current filter 230 and a voltage amplitude correcting unit 270, in addition to the configuration of sinusoidal wave PWM control unit 200 of FIG. 4.

Current filter 230 performs a process of smoothing d-axis current Id and q-axis current Iq calculated by coordinate conversion unit 220, in a time-base manner. Accordingly, actual currents Id, Iq based on the sensor detected values are filtered and hence converted into currents Idf, Iqf.

Then, using currents Idf, Iqf thus filtered, overmodulation PWM control unit 201 calculates current deviations ΔId, ΔIq. Specifically, ΔId=Idcom−Idf and ΔIq=Iqcom−Iqf.

Voltage amplitude correcting unit 270 performs a correction process onto original d-axis voltage command value Vd# and q-axis voltage command value Vq# calculated by voltage command generating unit 240, so as to increase the amplitude of the motor applied voltage. In accordance with the voltage commands thus subjected to the correction process performed by voltage amplitude correcting unit 270, coordinate conversion unit 250 and PWM modulation unit 260 generate switching control signals S3-S8 for inverter 14.

It should be noted that when the overmodulation PWM control is applied, the amplitude of each phase voltage command obtained by converting voltage command value Vd#, Vq# from two phases to three phases is greater than the input voltage (system voltage VH) of the inverter. This state corresponds to a state in which the amplitude of alternating-current voltage command 264 is greater than the amplitude of carrier 262 in the waveform diagram shown in FIG. 5. In this state, a voltage exceeding system voltage VH cannot be applied from inverter 14 to alternating-current motor M1. Accordingly, an original modulation factor corresponding to each of voltage command values Vd#, Vq# cannot be secured by the PWM control following each phase voltage command signal according to original voltage command values Vd#, Vq#.

To address this, the alternating-current voltage commands according to voltage command values Vd#, Vq# are corrected to increase the voltage amplitude (by k, k>1) so as to increase the period of voltage application. Accordingly, the original modulation factor according to each of voltage command values Vd#, Vq# can be secured. It should be noted that multiplication factor k for the voltage amplitude in voltage amplitude correcting unit 270 can be theoretically derived based on this original modulation factor.

(Problem in PWM Control)

Figure 8:
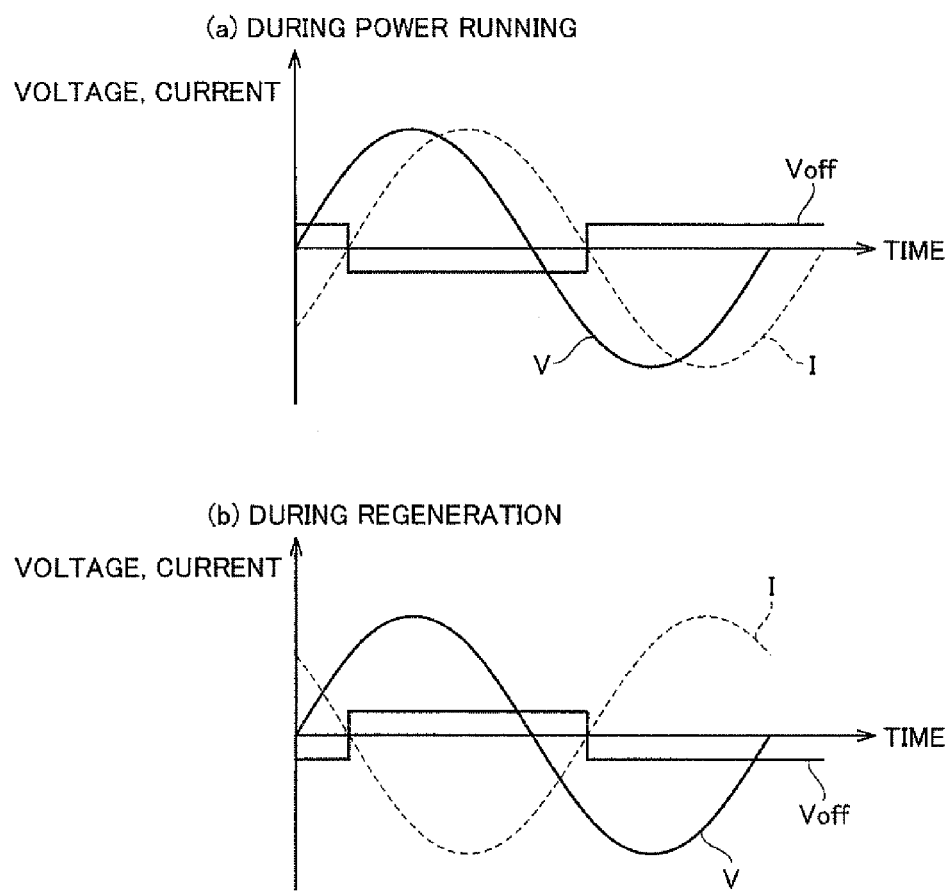
FIG. 8 is a schematic view showing typical voltage and current waveforms upon power running and regeneration of the alternating-current motor.
Figure 10:
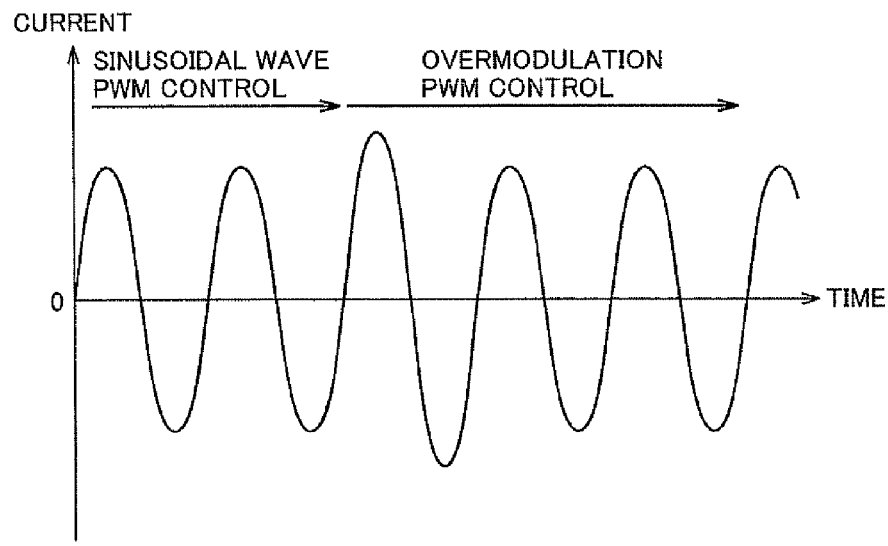
FIG. 10 is a waveform diagram showing one exemplary current fluctuation upon the control mode switching.

The following describes a problem in the motor control configurations according to the general PWM control (sinusoidal wave PWM control and overmodulation PWM control) shown in FIG. 4 and FIG. 7, with reference to FIGS. 8-10. Specifically, the problem here resides in control stability upon switching the control modes between the sinusoidal wave PWM control and the overmodulation PWM control.

As described above, when the overmodulation PWM control is applied, the fundamental wave component of the applied voltage to alternating-current motor M1 is increased by reducing the switching rate in inverter 14.

Meanwhile, in the sinusoidal wave PWM control in which asynchronous PWM is applied, the carrier frequency is set in a range higher than an audible frequency range and allowing for switching loss not excessive, irrespective of the rotational speed of alternating-current motor M1 (hereinafter, simply referred to as "motor rotation speed"). On the other hand, in the overmodulation PWM control, synchronous PWM control is applied, so the carrier frequency is controlled according to the motor rotation speed. Namely, the carrier frequency is set to be an integral multiple of the frequency of each voltage command that follows the motor rotation speed. Thus, since the carrier frequency is changed according to the motor rotation speed in the overmodulation PWM control, the switching rate in inverter 14 is likely to be changed. As a result, an amount of change in the switching rate upon switching the control modes between the sinusoidal wave PWM control and the overmodulation PWM control differs depending on a state of the overmodulation PWM control.

In particular, in the case where the switching rate is small in the overmodulation PWM control, the switching rate is drastically changed by switching between the sinusoidal wave PWM control and the overmodulation PWM control. This change of switching rate causes a great change in the influence of dead time over the motor applied voltage. Accordingly, upon switching between the control modes, the motor applied voltage may differ even if the voltage command is the same. Hence, just after switching between the control modes, the motor current is fluctuated according to the amount of change in motor applied voltage, with the result that an excessive motor current may flow in alternating-current motor M1. As a result, torque fluctuation may take place in alternating-current motor M1 during a period of time from the switching of the control modes until the fluctuation of the motor current is converged through the current feedback control.

Here, whether the motor applied voltage is changed to increase the amplitude thereof or is changed to decrease the amplitude thereof upon switching the control modes is associated with the phases of the motor applied voltage and the motor current as shown in FIGS. 8 and 9.

FIG. 8(a) shows typical voltage/current waveforms during power running of alternating-current motor M1. As shown in FIG. 8(a), during the power running, the phase of current I is delayed relative to the phase of voltage V. The motor applied voltage is influenced by the dead time, but the influence differs depending on the polarity of the current. Namely, during a period in which current I is positive, an approximate square wave voltage resulting from the dead time (offset Voff) is negative. In contrast, during a period in which current I is negative, Voff is positive. Hence, during the power running, offset Voff resulting from the dead time acts to decrease the amplitude of the motor applied voltage.

FIG. 9(a) shows a vector diagram of voltage V and current I upon the power running. In the figure, offset Voff is directed opposite to current I. Hence, when combined with this offset Voff, resultant voltage V is reduced in amplitude as compared with original voltage V.

Meanwhile, FIG. 8(b) shows typical voltage/current waveforms during the regeneration of alternating-current motor M1. As shown in FIG. 8(b), during the regeneration, a phase difference between voltage V and current I is large to such an extent that they have substantially opposite phases. Hence, during the regeneration, offset Voff resulting from the dead time acts to increase the amplitude of the motor applied voltage. FIG. 9(b) shows a vector diagram of voltage V and current I during the regeneration. In the figure, as with FIG. 9(a), offset Voff is directed opposite to current I, but voltage V has a phase reverse to that of current I. Hence, resultant voltage V combined with offset Voff is increased in amplitude as compared with original voltage V.

As such, the influence of the dead time over the motor applied voltage is changed according to the phase difference between voltage V and current I in alternating-current motor M1, i.e., the power factor. Thus, it is appreciated that characteristics in the change of the motor applied voltage caused by the control mode switching differs according to the power factor.

FIG. 10 is a waveform diagram showing exemplary current fluctuation upon switching the control modes. FIG. 10 shows a change in the motor current with passage of time in the case where the control modes are switched from the sinusoidal wave PWM control to the overmodulation PWM control during the power running of alternating-current motor M1.

Referring to FIG. 10, when the switching rate is reduced by the switching from the sinusoidal wave PWM control to the overmodulation PWM control during the power running of alternating-current motor M1, the influence of the dead time is changed, thereby changing the motor applied voltage. In this case, as shown in FIG. 8(a) and FIG. 9(a), the influence of the dead time acts to decrease the amplitude of the motor applied voltage during the power running. Hence, the switching to the overmodulation PWM control reduces the switching rate, thereby changing the motor applied voltage to increase the amplitude thereof. Accordingly, just after the switching of the control modes, the motor current is increased in response to the increase of the amplitude of the motor applied voltage. As a result, in alternating-current motor M1, torque fluctuation may take place during the period of time from the switching of the control modes until the fluctuation of the motor current is converged by the current feedback control.

Although not shown in the figures, when switched to the overmodulation PWM control during the regeneration of alternating-current motor M1, the amplitude of the motor applied voltage is changed to be reduced. Accordingly, in contrast to FIG. 10, the motor current is reduced just after the switching of the control modes. Hence, the characteristics in the change of the motor applied voltage caused by the switching of the control modes differ depending on the phase difference (power factor) between the voltage and the current supplied from inverter 14 to alternating-current motor M1.

(PWM Control in the Present Embodiment)

As described above, in the PWM control, the change in the switching rate upon the switching of the control modes causes the change of the influence of the dead time over the motor applied voltage, resulting in the change of the motor applied voltage. This change of the motor applied voltage serves as a factor of causing the torque fluctuation in alternating-current motor M1. It should be noted that the characteristics in the change of the motor applied voltage are changed according to the switching state (power conversion operation state) of inverter 14 as described above.

In view of this, the control device for the alternating-current motor according to the present embodiment is configured to correct the voltage command value upon switching the control modes in the PWM control, based on a switching state of inverter 14, in order to suppress the change of the influence of the dead time over the motor applied voltage.

In this configuration, as the switching state of inverter 14, the followings are reflected: the carrier frequencies before and after the switching of the control modes; the length of the dead time; the power factor of alternating-current motor M1 (phase difference between the voltage and the current); and the driving state (power running/regeneration) of alternating-current motor M1. Of these plurality of factors, the carrier frequencies before and after the switching of the control modes, and the length of the dead time mainly serve as indices regarding the amount of change in the motor applied voltage. The power factor and driving state of alternating-current motor M1 mainly serve as indices regarding a manner of the change in the motor applied voltage (whether to increase the amplitude or decrease the amplitude).

Described in the embodiment below is a configuration for correcting the voltage command value by combining the plurality of factors. However, there may be employed a configuration for correcting the voltage command value based on any one of the factors or a combination of two or more factors.

Figure 11:
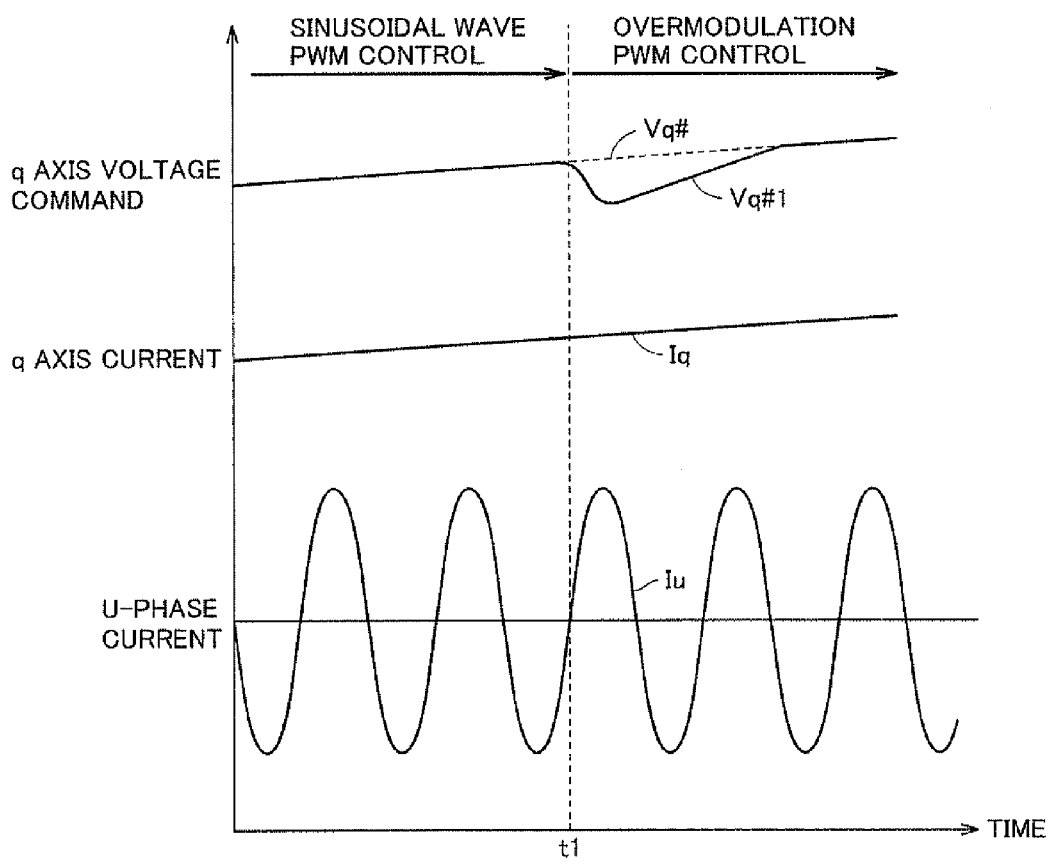
FIG. 11 illustrates a correcting process for each voltage command value upon the control mode switching in the PWM control according to the embodiment of the present invention.

FIG. 11 illustrates the process of correcting the voltage command value upon the switching of the control modes in the PWM control according to the present embodiment. As with FIG. 10, FIG. 11 shows changes in the motor applied voltage and the motor current with passage of time in the case where the control modes are switched from the sinusoidal wave PWM control to the overmodulation PWM control during the power running of alternating-current motor M1.

Referring to FIG. 11, it is assumed that switching is made from the sinusoidal wave PWM control to the overmodulation PWM control at time t1. The control modes are switched when the modulation factor exceeds the predetermined threshold value (for example, 0.61, which is the theoretical maximal value of the modulation factor while the sinusoidal wave PWM control is applied) as illustrated in FIG. 6. Here, although there is not a large difference in the voltage command values before and after the switching of the control modes, the influence of the dead time is changed according to the reduction of the switching rate as described with reference to FIG. 10. Hence, the motor applied voltage is changed to increase the amplitude thereof.

In order to suppress the change of the motor applied voltage upon the switching of the control modes, in the present embodiment, the voltage command value at time t1 at which the control modes are switched is corrected to compensate an estimated amount of change in the motor applied voltage. It should be noted that the amount of change in the motor applied voltage is estimated based on the switching state of inverter 14.

Specifically, in the case of FIG. 11, by the switching from the sinusoidal wave PWM control to the overmodulation PWM control, the motor applied voltage is changed to increase the amplitude thereof. Hence, at time t1, the voltage command value (for example, q-axis voltage command value Vq#) is corrected to be smaller by the amount of increase in the amplitude of the motor applied voltage. It should be noted that the correction of the voltage command value is performed in the first one control period just after the switching of the control modes.

Thus, after time t1, the motor current is controlled through feedback in accordance with the corrected voltage command value Vq#1, and therefore q-axis current Iq is continuously changed from before and after time t1. As a result, motor current Iu is not increased even just after the switching of the control modes, thereby suppressing occurrence of torque fluctuation in alternating-current motor M1.

As such, in the present embodiment, the estimated amount of change in the motor applied voltage is included, as a feed forward component, in the voltage command value upon the switching of the control modes. This achieves suppressed torque fluctuation in alternating-current motor M1. Accordingly, control stability in alternating-current motor M1 can be improved.

(Control Structure)

The following describes a motor control structure for implementing the above-described PWM control in the present embodiment.

Figure 12:
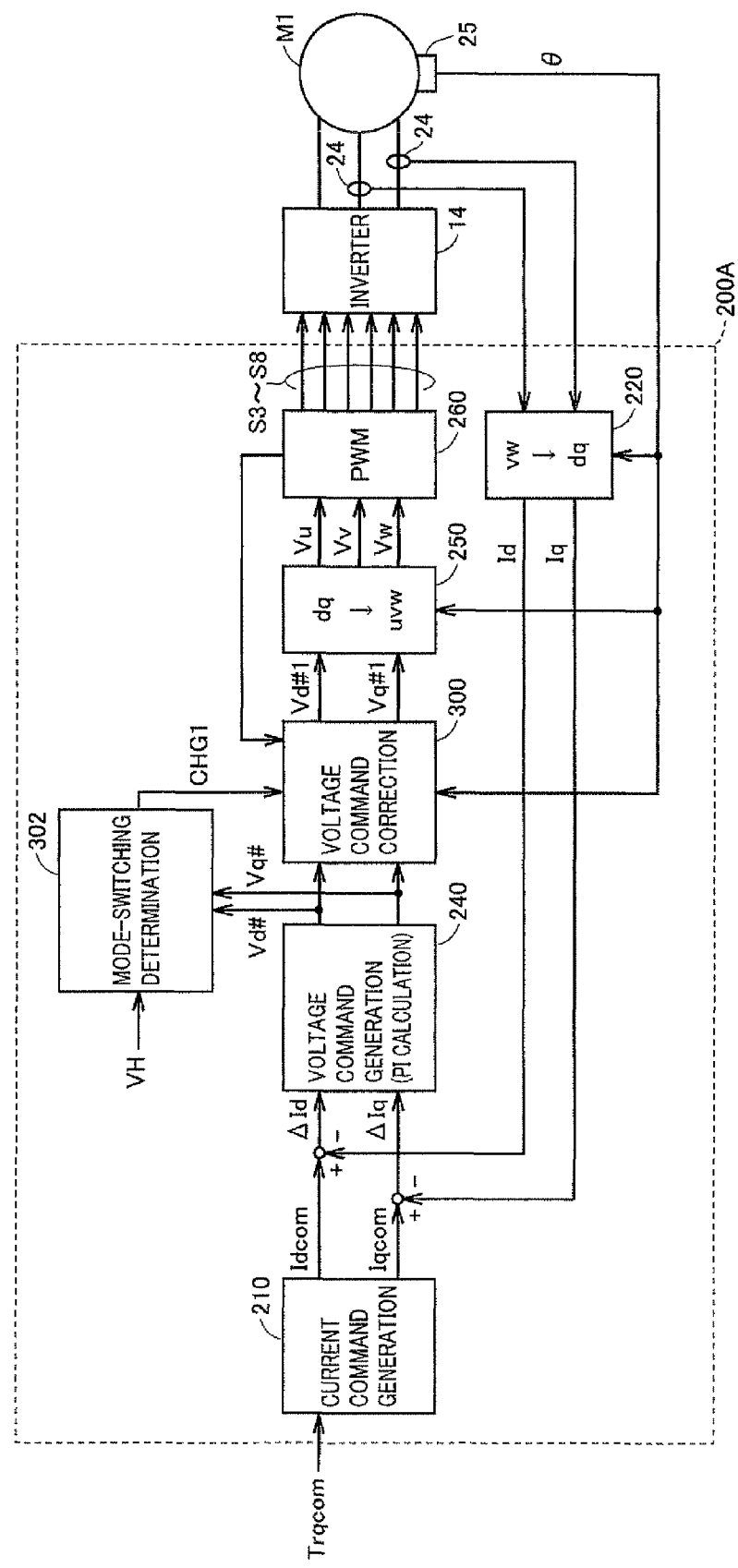
FIG. 12 is a block diagram illustrating a motor control configuration for the sinusoidal wave PWM control performed by the control device for the alternating-current motor in the embodiment of the present invention.

FIG. 12 is a block diagram illustrating a motor control configuration for the sinusoidal wave PWM control performed by the control device for the alternating-current motor in the embodiment of the present invention.

Referring to FIG. 12, a sinusoidal wave PWM control unit 200A in the embodiment of the present invention is different from sinusoidal wave PWM control unit 200 shown in FIG. 4 as a comparative example, in that sinusoidal wave PWM control unit 200A includes a voltage command correcting unit 300 and a mode-switching determining unit 302.

Mode-switching determining unit 302 determines switching between the sinusoidal wave PWM control and the overmodulation PWM control in the PWM control mode. Mode-switching determining unit 302 makes mode switching determination based on input voltage VH of inverter 14 detected by voltage sensor 13 (FIG. 1), and d-axis voltage command value Vd# and q-axis voltage command value Vq# generated by voltage command generating unit 240.

Specifically, mode-switching determining unit 302 calculates modulation factor FM to be used upon converting input voltage VH of inverter 14 into motor applied voltage command (alternating-current voltage) for alternating-current motor M1 in accordance with formula (1) described above. Then, mode-switching determining unit 302 compares calculated modulation factor FM with the predetermined threshold value (for example, 0.61). When modulation factor FM is equal to or smaller than the threshold value, mode-switching determining unit 302 maintains the sinusoidal wave PWM control currently applied. On the other hand, when modulation factor FM exceeds the threshold value, mode-switching determining unit 302 generates a control signal CHG1 to instruct switching from the currently applied sinusoidal wave PWM control to the overmodulation PWM control, and outputs it to voltage command correcting unit 300.

When voltage command correcting unit 300 receives control signal CHG1 from mode-switching determining unit 302, i.e., when instructed to switch to the overmodulation PWM control, voltage command correcting unit 300 corrects d-axis voltage command value Vd# and q axis voltage command value Vq# based on the switching state of inverter 14, so as to suppress the influence of the dead time over the motor applied voltage.

Specifically, based on the switching state of inverter 14, voltage command correcting unit 300 first estimates an amount of change in the motor applied voltage to be obtained upon switching to the overmodulation PWM control.

In doing so, from PWM modulation unit 260, voltage command correcting unit 300 obtains, as the switching state of inverter 14, the frequency (carrier frequency) of carrier 262 at present (FIG. 5) and the length (fixed value) of the dead time. Further, voltage command correcting unit 300 obtains, as the switching state of inverter 14, an estimate value of the carrier frequency to be obtained when transition is made to the overmodulation PWM control. The estimate value of the carrier frequency is calculated based on the motor rotation speed determined from rotation angle θ of alternating-current motor M1 obtained from rotational angle sensor (resolver) 25. Namely, the carrier frequency is calculated as an integral multiple (preferably, 3·(2n-1) times, where n is a natural number) of the frequency of each voltage command that follows the motor rotation speed.

Further, voltage command correcting unit 300 obtains, as the switching state of inverter 14, the phase difference (power factor) between the voltage and the current supplied from inverter 14 to alternating-current motor M1. It should be noted that the power factor in the PWM control at present can be determined from the detected values of the voltage and the current. Alternatively, the power factor can be determined from d-axis and q-axis voltage command values Vd#, Vq# and current command values Idcom, Iqcom used in the PWM control. For example, the power factor can be determined from a phase difference between a voltage phase tan-1 (Vq#/Vd#) associated with the voltage command values and a current phase tan-1 (Iqcom/Idcom) associated with the current command values.

In addition to the power factor (phase difference between the voltage and the current), voltage command correcting unit 300 obtains the driving state (power running/regeneration) of alternating-current motor M1. Whether alternating-current motor M1 is performing power running or regeneration can be determined based on, for example, torque command value Trqcom and the rotational speed of alternating-current motor M1.

Next, when voltage command correcting unit 300 obtains these plurality of pieces of information as the switching state of inverter 14, based on the plurality of pieces of information, voltage command correcting unit 300 estimates what amount of change will be obtained in the motor applied voltage upon switching to the overmodulation PWM control and how the change will be made (whether to increase the amplitude thereof or to decrease the amplitude thereof).

Specifically, voltage command correcting unit 300 estimates the amount of change in the motor applied voltage to be caused by the influence of the dead time resulting from the reduction of the switching rate, based on the carrier frequency in the sinusoidal wave PWM control at present, the estimate value of the carrier frequency to be obtained when transitioned to the overmodulation PWM control, and the length of the dead time. Further, voltage command correcting unit 300 estimates how the motor applied voltage will be changed (whether to increase the amplitude thereof or to decrease the amplitude thereof), based on the power factor and the driving state of alternating-current motor M1.

Then, voltage command correcting unit 300 corrects d-axis and q-axis voltage command values Vd#, Vq# in accordance with the manner of the estimated change in the motor applied voltage, so as to compensate the estimated amount of change in the motor applied voltage. D-axis and q-axis voltage command values Vd#1, Vq#1 thus corrected are output to coordinate conversion unit 250.

Figure 13:
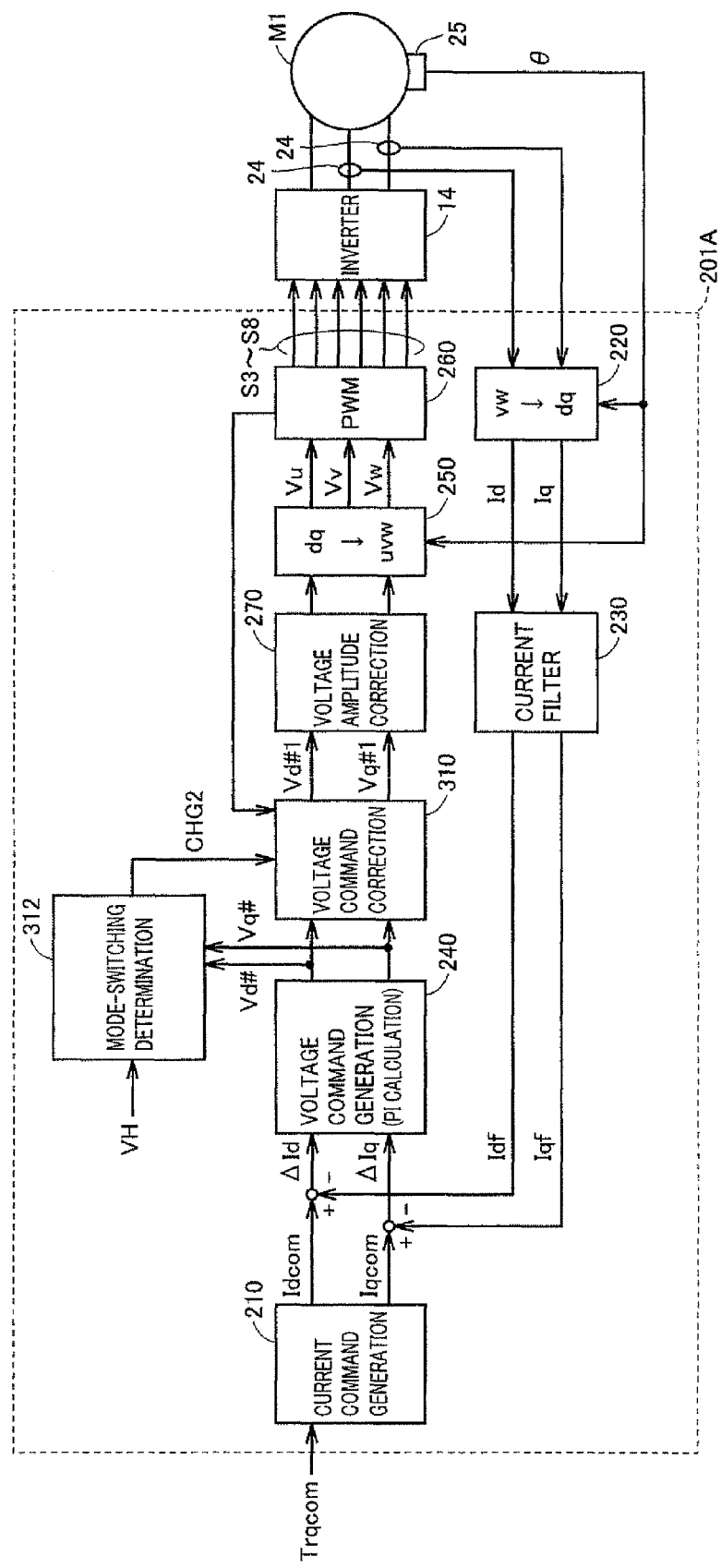
FIG. 13 is a block diagram illustrating a motor control configuration for the overmodulation PWM control performed by the control device for the alternating-current motor in the embodiment of the present invention.

FIG. 13 is a block diagram illustrating a motor control configuration for the overmodulation PWM control performed by the control device for the alternating-current motor in the embodiment of the present invention.

Referring to FIG. 13, an overmodulation PWM control unit 201A in the embodiment of the present invention is different from overmodulation PWM control unit 201 shown in FIG. 7 as a comparative example, in that overmodulation PWM control unit 201A further includes a voltage command correcting unit 310 and a mode-switching determining unit 312.

Mode-switching determining unit 312 determines the switching between the sinusoidal wave PWM control and the overmodulation PWM control in the PWM control mode. Mode-switching determining unit 312 makes mode switching determination based on input voltage VH of inverter 14 detected by voltage sensor 13 (FIG. 1), and d-axis voltage command value Vd# and q-axis voltage command value Vq# generated by voltage command generating unit 240.

Specifically, mode-switching determining unit 312 calculates modulation factor FM to be used upon converting input voltage VH of inverter 14 into motor applied voltage command (alternating-current voltage) for alternating-current motor M1 in accordance with formula (1) described above. Then, mode-switching determining unit 312 compares calculated modulation factor FM with the predetermined threshold value (for example, 0.61). When modulation factor FM exceeds the threshold value, mode-switching determining unit 312 maintains the overmodulation PWM control currently applied. On the other hand, when modulation factor FM is equal to or smaller than the threshold value, mode-switching determining unit 312 generates a control signal CHG2 to instruct switching from the currently applied overmodulation PWM control to the sinusoidal wave PWM control, and outputs it to voltage command correcting unit 310.

When voltage command correcting unit 310 receives control signal CHG2 from mode-switching determining unit 312, i.e., when instructed to switch to the sinusoidal wave PWM control, voltage command correcting unit 310 corrects d-axis voltage command value Vd# and q-axis voltage command value Vq# based on the switching state of inverter 14, so as to suppress the influence of the dead time over the motor applied voltage.

Specifically, based on the switching state of inverter 14, voltage command correcting unit 310 first estimates an amount of change in the motor applied voltage to be obtained upon switching to the sinusoidal wave PWM control.

In doing so, from PWM modulation unit 260, voltage command correcting unit 310 obtains, as the switching state of inverter 14, the frequency (carrier frequency) of carrier 262 at present (FIG. 5) and the length (fixed value) of the dead time. Further, voltage command correcting unit 300 obtains, as the switching state of inverter 14, the estimate value of the carrier frequency to be obtained when transitioned to the sinusoidal wave PWM control. The estimate value of the carrier frequency can be determined based on a relation between the state of alternating-current motor M1 (torque and rotational speed) previously set irrespective of the motor rotation speed and the carrier frequency.

Further, voltage command correcting unit 310 obtains, as the switching state of inverter 14, the phase difference (power factor) between the voltage and the current supplied from inverter 14 to alternating-current motor M1 as well as the driving state (power running/regeneration) of alternating-current motor M1. It should be noted that the power factor in the PWM control at present can be determined from the detected values of the voltage and the current or d-axis and q-axis voltage command values Vd#, Vq# and current command values Idcom, Iqcom, as described with reference to FIG. 12. Whether alternating-current motor M1 is performing power running or regeneration can be determined based on, for example, torque command value Trqcom and the rotational speed of alternating-current motor M1.

Next, voltage command correcting unit 310 obtains these plurality of pieces of information as the switching state of inverter 14. Then, based on the plurality of pieces of information, voltage command correcting unit 300 estimates, using a below-described method, what amount of change will be obtained in the motor applied voltage upon switching to the sinusoidal wave PWM control and how the change will be made (whether to increase the amplitude thereof or to decrease the amplitude thereof).

Specifically, voltage command correcting unit 310 estimates the amount of change in the motor applied voltage caused by the influence of the dead time resulting from the increase of the switching rate, based on the carrier frequency in the overmodulation PWM control at present, the estimate value of the carrier frequency to be obtained when transitioned to the sinusoidal wave PWM control, and the length of the dead time. Further, voltage command correcting unit 310 estimates how the motor applied voltage will be changed (whether to increase the amplitude thereof or to decrease the amplitude thereof), based on the power factor and the driving state of alternating-current motor M1.

Then, voltage command correcting unit 310 corrects d-axis and q-axis voltage command values Vd#, Vq# in accordance with the manner of the estimated change in the motor applied voltage, so as to compensate the estimated amount of change in the motor applied voltage. D-axis, and q-axis voltage command values Vd#1, Vq#1 thus corrected are output to voltage amplitude correcting unit 270.

(Voltage Command Correcting Process)

The following describes the correcting process for each of the voltage command values in the motor control configurations shown in FIG. 12 and FIG. 13. In the correcting process for each of the voltage command values, voltage command correcting units 300 (FIG. 12), 310 (FIG. 13) correct the voltage commands by control device 30 performing control processes in accordance with flowcharts shown in FIG. 14 and FIG. 15.

Figure 14:
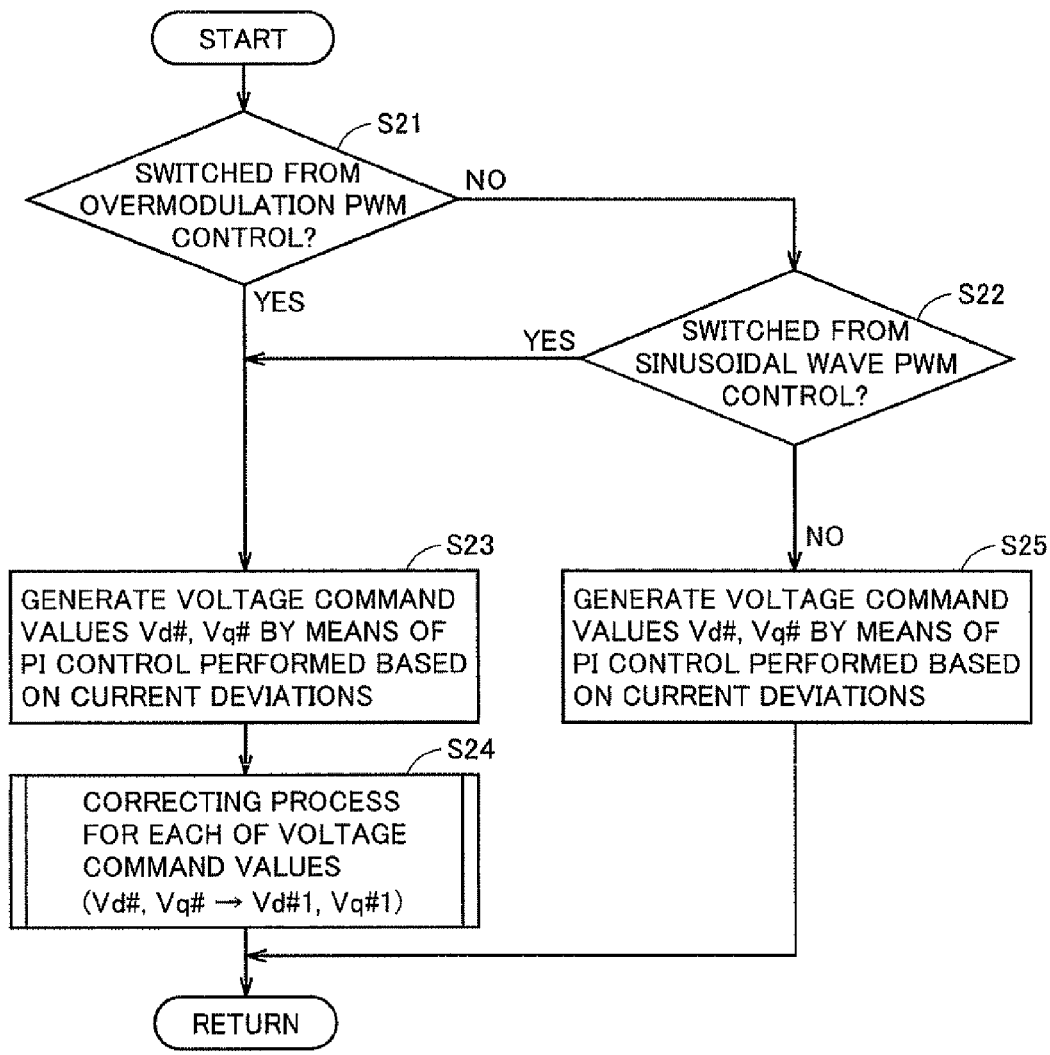
FIG. 14 is a flowchart illustrating a correcting process for each voltage command value in each of the motor control configurations shown in FIG. 12 and FIG. 13.

Referring to FIG. 14, control device 30 first determines in step S21 whether or not the control modes are currently being switched from the overmodulation PWM control. When the switching from the overmodulation PWM control is not being performed or has not been just done (it has been determined NO in step S21), control device 30 further determines in step S22 whether or not the control modes are being switched from the sinusoidal wave PWM control.

When the switching from the sinusoidal wave PWM control is not being performed or has not been just done (it has been determined NO in step S22), control device 30 generates voltage command values Vd#, Vq# by means of feedback control performed based on current deviations ΔId, ΔIq (step S25).

Meanwhile, when the switching from the overmodulation PWM control is being performed or has been just done (it is determined YES in step S21) or when the switching from the sinusoidal wave PWM control is being performed or has been just done (it is determined YES in step S22), control device 30 generates in step S23 voltage command values Vd#, Vq# by means of feedback control performed based on current deviations ΔId, ΔIq, and then performs the correcting processes to the generated voltage command values Vd#, Vq# in order to suppress the change of the motor applied voltage to be caused by the influence of the dead time (step S24).

Figures 15, 16:
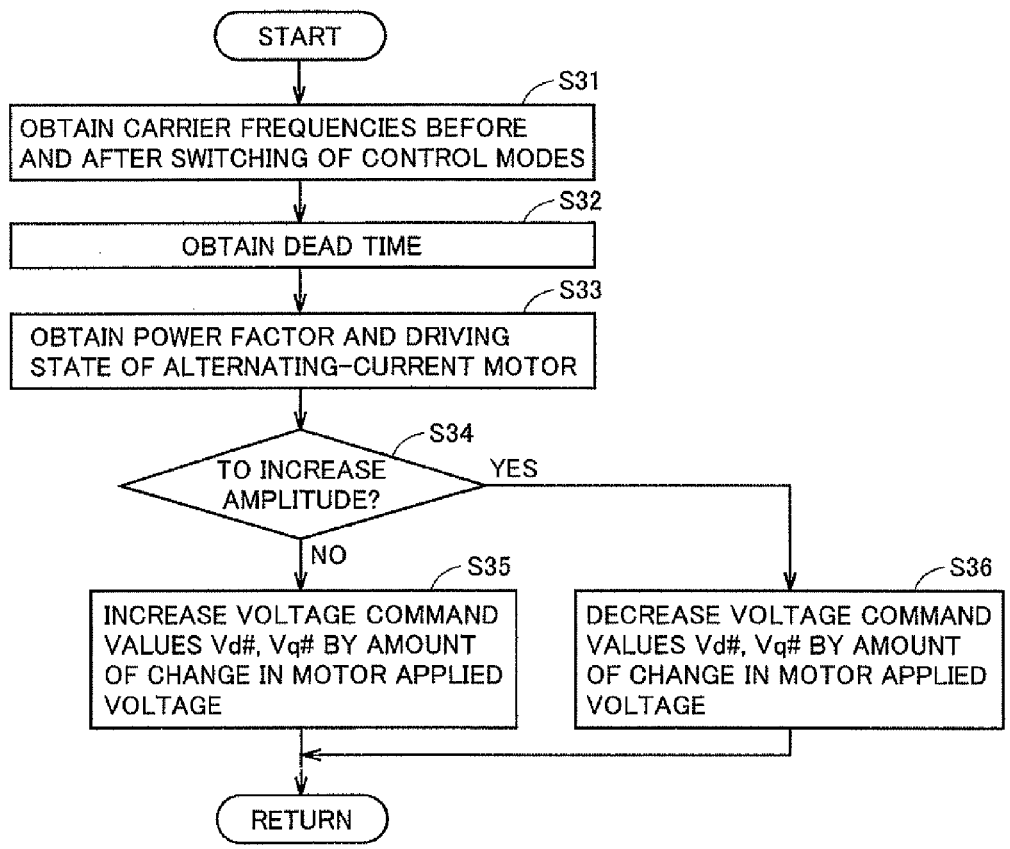
FIG. 15 is a flowchart illustrating the correcting process for each voltage command value in each of the motor control configurations shown in FIG. 12 and FIG. 13.
FIG. 16 shows one exemplary map of modulation factors used upon the control mode switching.

In the correcting process for each of voltage command values Vd#, Vq#, first, referring to FIG. 15, control device 30 obtains the switching state of inverter 14. Specifically, control device 30 obtains the carrier frequencies before and after the switching of the control modes (step S31), and obtains the length of the dead time (step S32). It should be noted that the estimate value of the carrier frequency to be obtained when transitioned to the sinusoidal wave PWM control (or overmodulation control) is applied to the carrier frequency after the switching of the control modes.

Further, control device 30 obtains the phase difference (power factor) between the voltage and the current supplied from inverter 14 to alternating-current motor M1, and the driving state (power running/regeneration) of alternating-current motor M1 (step S33). Then, control device 30 determines, based on the power factor and the driving state of alternating-current motor M1, whether or not the motor applied voltage is changed to increase the amplitude thereof upon the switching of the control modes (step S34).

When the motor applied voltage is not changed to increase the amplitude thereof (it has been determined NO in step S34), control device 30 corrects voltage command values Vd#, Vq# generated in step S23 (FIG. 14), so as to increase voltage command values Vd#, Vq# by the estimated amount of change in the motor applied voltage (step S35). The amount of change has been estimated based on the pieces of information obtained in steps S31, S32. On the other hand, when the motor applied voltage is changed to increase the amplitude thereof (it has been determined YES in step S34), control device 30 corrects voltage command values Vd#, Vq# to decrease voltage command values Vd#, Vq# by the estimated amount of change in the motor applied voltage (step S36).

Here, the characteristics of the change in the motor applied voltage (the amount of change and the manner of change) resulting from the switching of the control modes can be estimated as follows. That is, the characteristics of the change in the motor applied voltage can be calculated in real time using a previously constructed motor model of alternating-current motor M1, by utilizing the switching state of inverter 14, i.e., any one or at least a part of the carrier frequencies before and after the switching of the control modes, the length of the dead time, the power factor, and the driving state of alternating-current motor M1.

Alternatively, for suppression of increase of control load through the real time calculation, the characteristics of the change in the motor applied voltage upon switching the control modes between the sinusoidal wave PWM control and the overmodulation PWM control can be readily estimated based on measurement data of previously measured, randomly changed switching states of inverter 14.

When estimating the characteristics of the change in the motor applied voltage from the measurement data, as shown in FIG. 16, modulation factors adapted to compensate the estimated characteristics of the change in the motor applied voltage are derived in advance, and the adapted values of the modulation factors are previously mapped and stored in a ROM (Read Only Memory) not shown in the figures, thereby calculating corrected voltage command values Vd#1, Vq#1 using the map read out from the ROM upon switching the control modes.

FIG. 16 shows one example of the map of the modulation factors used upon switching the control modes. FIG. 16 shows the modulation factors adapted for the switching states of inverter 14 upon the switching from the sinusoidal wave PWM control to the overmodulation PWM control.

Referring to FIG. 16, there are set a plurality of patterns of combinations of carrier frequencies obtained while the sinusoidal wave PWM control is being applied and estimate values of the carrier frequencies to be obtained when transitioned to the overmodulation PWM control. For each of the plurality of patterns, the adapted value of the modulation factor for the switching of the control modes is set.

It should be noted that a different value is set to the adapted value of the modulation factor for each pattern depending on the driving state of alternating-current motor M1. Now, a pattern is exemplified which corresponds to a case where the carrier frequency while the sinusoidal wave PWM control is applied is fc1 and the estimate value of the carrier frequency to be obtained when transitioned to the overmodulation PWM control is fo1. In such a pattern, during the power running of alternating-current motor M1, the modulation factor is adapted to a value (0.61−ΔF1) decreased by ΔF1 from the predetermined threshold value. On the other hand, during the regeneration, the modulation factor is adapted to a value (0.61+ΔF1) increased by ΔF1 from the predetermined threshold value.

Thus, the manner of adaptation with respect to the predetermined threshold value (whether to increase the modulation factor or decrease the modulation factor) differs between the power running and the regeneration. This is because the characteristics of the change in the motor applied voltage caused by the control mode switching differs according to the power factor as described with reference to FIG. 8 and FIG. 9. In other words, during the power running, the power factor is large (i.e., the phase difference between the voltage and the current is small), so a change in the dead time resulting from the reduction of the switching rate acts to increase the amplitude of the motor applied voltage. On the other hand, during the regeneration, the power factor is small (i.e., the phase difference between the voltage and the current is large), so a change in the dead time resulting from the reduction of the switching rate acts to decrease the amplitude of the motor applied voltage.

It should be noted that although not shown in the figures, a map may be constructed for each of the plurality of patterns shown in FIG. 16, so as to set an adapted value of the modulation factor in accordance with a combination of the driving state and the power factor of alternating-current motor M1, or in accordance with the power factor.

(Variation)

As shown in FIG. 16, in accordance with a switching state of inverter 14, the map is constructed to set an adapted value of a modulation factor employed upon the control mode switching, thereby readily calculating corrected voltage command values Vd#1, Vq#1 to be used upon the control mode switching.

Meanwhile, the map in FIG. 16 is constructed based on such an assumption that the motor rotation speed is hardly changed in one control period coming before and after the control mode switching, i.e., is in a steady state. Hence, if there occurs a phenomenon of abruptly changing the motor rotation speed in one control period coming before and after the control mode switching, for example, if slip or grip occurs in a driving wheel, voltage command values Vd#1, Vq#1 determined from the map of FIG. 16 may become too large or too small for voltage command values necessary to suppress a change in the motor applied voltage. This may result in a difficulty in securely suppressing torque fluctuation taking place upon the control mode switching.

To address this, in the present variation, if slip and grip are detected upon the control mode switching, the adapted value of a modulation factor determined from the map of FIG. 16 is changed to a modulation factor adapted corresponding to each of the slip and grip.

It should be noted that as shown in FIG. 17, the adapted value of the changed modulation factor may be determined as follows. For each of the adapted values of the modulation factors in the map of FIG. 16, an adapted value of a modulation factor for slip detected and an adapted value of a modulation factor for grip detected are determined in advance based on measurement data. Alternatively, instead of constructing the map of FIG. 17, the modulation factor may be maintained at the original threshold value (0.61) without adapting the modulation factor, when slip and grip are detected.

FIG. 18 is a flowchart illustrating the correcting process for each of the voltage command values in the variation of the present embodiment.

Referring to FIG. 18, first, control device 30 obtains the switching state of inverter 14. Specifically, control device 30 obtains carrier frequencies before and after the control mode switching (step S31), and obtains the length of dead time (step S32). It should be noted that the estimate value of the carrier frequency to be obtained when transitioned to the sinusoidal wave PWM control (or the overmodulation control) is applied to the carrier frequency after the control mode switching.

Further, control device 30 obtains a phase difference (power factor) between a voltage and a current supplied from inverter 14 to alternating-current motor M1, and obtains a driving state of alternating-current motor M1 (power running/ regeneration) (step S33). Further, control device 30 obtains a rotation angle θ of alternating-current motor M1 from rotational angle sensor (resolver) 25 (FIG. 1) (step S330).

Then, control device 30 calculates the rotational rate (rotational speed) of alternating-current motor M1 based on rotation angle θ thus obtained, and determines, based on the calculated rotational speed, whether or not slip or grip is taking place in a driving wheel (step S340).

When slip or grip is not taking place in a driving wheel (it has been determined NO in step S340), control device 30 makes reference to a modulation factor for the steady state in the map of FIG. 17, so as to calculate an adapted value of the modulation factor in accordance with the switching state of inverter 14 (step S341). On the other hand, when slip or grip is taking place in a driving wheel (it has been determined YES in step S340), control device 30 makes reference to a modulation factor for slip/grip in the map of FIG. 17, so as to calculate an adapted value of the modulation factor in accordance with the switching state of inverter 14 (step S342).

Then, control device 30 sets corrected voltage command values Vd#1, Vq#1 based on the adapted value of the modulation factor calculated in each of steps S341, S342 (step S343).

As described above, according to the variation shown in FIG. 17 and FIG. 18, torque fluctuation of alternating-current motor M1 can be suppressed by performing the correcting process for each of the voltage command values upon the control mode switching, even in the case where the rotational speed of alternating-current motor M1 is abruptly changed before and after the control mode switching. As a result, stability in control of alternating-current motor M1 can be increased.

Corresponding relations between the present embodiment and each configuration of the present invention are as follows. That is, alternating-current motor M1 corresponds to an "alternating-current motor" in the present invention, inverter 14 corresponds to an "inverter" in the present invention, and control device 30 corresponds to a "control device" in the present invention. Control device 30 implements a "pulse width modulation unit" and a "mode-switching determining unit" in the present invention.

Described in the present embodiment as a preferable exemplary configuration is a configuration in which direct-current voltage generating unit 10# in the motor driving system includes step-up/step-down converter 12 so as to variably control the input voltage of inverter 14 (system voltage VH). However, so long as the input voltage of inverter 14 can be variably controlled, direct-current voltage generating unit 10# is not limited to the configuration exemplified in the present embodiment. Further, it is not essential that the input voltage of the inverter is variable, and the present invention is also applicable to a configuration in which the output voltage of direct-current power source B is directly sent to inverter 14 (for example, a configuration in which step-up/step-down converter 12 is not provided).

Further, in the present embodiment, it is assumed that the alternating-current motor, which serves as a load of the motor driving system, is a permanent magnet motor mounted on an electrically powered vehicle (hybrid vehicle, electric vehicle, or the like) to drive the vehicle. However, the invention of the present application is also applicable to a configuration in which an arbitrary alternating-current motor used in other devices serves as a load.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The present invention is applicable to an alternating-current motor to which pulse width modulation control having a sinusoidal wave modulation mode and an overmodulation mode is applied.

DESCRIPTION OF THE REFERENCE SIGNS

5: earth line; 6, 7: power line; 10, 13: voltage sensor; 10#: direct-current voltage generating unit; 11, 24: current sensor, 12: step-up/step-down converter; 14: inverter; 15: U-phase upper/lower arm; 16: V-phase upper/lower arm; 17: W-phase upper/lower arm; 25: rotational angle sensor; 30: control device; 100: motor driving control system; 200, 200A: sinusoidal wave PWM control unit; 201, 201A: overmodulation PWM control unit; 210: current command generating unit; 220, 250: coordinate conversion unit; 230: current filter; 240: voltage command generating unit; 260: PWM modulation unit, 262: carrier; 264: alternating-current voltage command, 270: voltage amplitude correcting unit; 300, 310: voltage command correcting unit; 302, 312: mode-switching determining unit; C0, C1: smoothing capacitor; D1-D8: anti-parallel diode, L1: reactor; M1: alternating-current motor; Q1-Q8: power semiconductor switching element; SR1, SR2: system relay.

The invention claimed is:

1. A control device for an alternating-current motor to which a voltage controlled by an inverter is applied, the control device comprising:
a pulse width modulation control unit for generating a control command for said inverter by means of pulse width modulation control performed based on a comparison between a voltage command signal of a sinusoidal wave and a carrier signal, said voltage command signal being for operating said alternating-current motor in accordance with an operating command; and
a mode-switching determining unit for instructing which control mode of an overmodulation mode and a sinusoidal wave modulation mode is to be employed for said pulse width modulation control performed by said pulse width modulation control unit, in said overmodulation mode, said voltage command signal having an amplitude larger than that of said carrier signal, in said sinusoidal wave modulation mode, said voltage command signal having an amplitude equal to or smaller than that of said carrier signal,
said inverter including a power semiconductor switching element to be turned on/off in accordance with said control command from said pulse width modulation control unit, wherein
when said mode-switching determining unit instructs to switch the control modes between said overmodulation mode and said sinusoidal wave modulation mode, said pulse width modulation control unit corrects the amplitude of said voltage command signal based on a state of a power conversion operation performed by said inverter, so as to suppress a change in an influence of dead time over the voltage applied to said alternating-current motor upon switching the control modes.

2. The control device for the alternating-current motor according to claim 1, wherein:
said pulse width modulation control unit includes
a frequency control unit for controlling, in said overmodulation mode, a frequency of said carrier signal to be an integral multiple of a rotational frequency of said alternating-current motor, in accordance with a rotational speed of said alternating-current motor, and controlling, in said sinusoidal wave modulation mode, the frequency of said carrier signal in accordance with operation states of said inverter and said alternating-current motor irrespective of the rotational speed of said alternating-current motor,
a voltage change amount estimating unit for estimating an amount of change, to be caused upon switching the control modes, in the voltage applied to said alternating-current motor, based on at least one of a present value of the frequency of said carrier signal in a control mode currently employed, an estimated value of the frequency of said carrier signal to be obtained when switching the control modes, a length of the dead time, a power factor of alternating-current power exchanged between said inverter and said alternating-current motor, and a driving state of said alternating-current motor, and
a voltage command correcting unit for correcting the amplitude of said voltage command signal so as to compensate the amount of change in the voltage applied to said alternating-current motor, the amount of change having been estimated by said voltage change amount estimating unit.

3. A control method for an alternating-current motor to which a voltage controlled by an inverter is applied, the control method comprising the steps of:
generating a control command for said inverter by means of pulse width modulation control performed based on a comparison between a voltage command signal of a sinusoidal wave and a carrier signal, said voltage command signal being for operating said alternating-current motor in accordance with an operating command; and
instructing which control mode of an overmodulation mode and a sinusoidal wave modulation mode is to be employed for said pulse width modulation control, in said overmodulation mode, said voltage command signal having an amplitude larger than that of said carrier signal, in said sinusoidal wave modulation mode, said voltage command signal having an amplitude equal to or smaller than that of said carrier signal,
said inverter including a power semiconductor switching element to be turned on/off in accordance with said control command,
when instructed to switch the control modes between said overmodulation mode and said sinusoidal wave modulation mode, the step of generating said control command for said inverter correcting the amplitude of said voltage command signal based on a state of a power conversion operation performed by said inverter, so as to suppress a change in an influence of dead time over the voltage applied to said alternating-current motor upon switching the control modes.

4. The control method for the alternating-current motor according to claim 3, wherein:
   the step of generating said control command for said inverter including the steps of
   controlling, in said overmodulation mode, a frequency of said carrier signal to be an integral multiple of a rotational frequency of said alternating-current motor, in accordance with a rotational speed of said alternating-current motor, and controlling, in said sinusoidal wave modulation mode, the frequency of said carrier signal in accordance with operation states of said inverter and said alternating-current motor irrespective of the rotational speed of said alternating-current motor,
   estimating an amount of change, to be caused upon switching the control modes, in the voltage applied to said alternating-current motor, based on at least one of a present value of the frequency of said carrier signal in a control mode currently employed, an estimated value of the frequency of said carrier signal to be obtained when switching the control modes, a length of the dead time, a power factor of alternating-current power exchanged between said inverter and said alternating-current motor, and a driving state of said alternating-current motor, and
   correcting the amplitude of said voltage command signal so as to compensate the estimated amount of change in the voltage applied to said alternating-current motor.

* * * * *